US011045940B2

(12) United States Patent
Angold et al.

(10) Patent No.: US 11,045,940 B2
(45) Date of Patent: Jun. 29, 2021

(54) DEVICES FOR THE SUPPORT OF TOOLS

(71) Applicant: Ekso Bionics, Inc., Richmond, CA (US)

(72) Inventors: Russdon Angold, American Canyon, CA (US); Mario Solano, Richmond, CA (US); Chris Paretich, Larkspur, CA (US); Thomas Mastaler, Hercules, CA (US); Brett Jaeger, Oakland, CA (US); Nicholas Fleming, Oakland, CA (US); Katherine Calvert, Berkeley, CA (US); Matthew D. Sweeney, Sacramento, CA (US)

(73) Assignee: Ekso Bionics, Inc., Richmond, CA (US)

( * ) Notice: Subject to any disclaimer, the term of this patent is extended or adjusted under 35 U.S.C. 154(b) by 134 days.

(21) Appl. No.: 16/332,924

(22) PCT Filed: Sep. 14, 2017

(86) PCT No.: PCT/US2017/051451
§ 371 (c)(1),
(2) Date: Mar. 13, 2019

(87) PCT Pub. No.: WO2018/053063
PCT Pub. Date: Mar. 22, 2018

(65) Prior Publication Data
US 2019/0247994 A1    Aug. 15, 2019

Related U.S. Application Data

(60) Provisional application No. 62/394,542, filed on Sep. 14, 2016.

(51) Int. Cl.
*B25J 1/02*        (2006.01)
*B25H 1/00*        (2006.01)
(Continued)

(52) U.S. Cl.
CPC ............ *B25H 1/005* (2013.01); *B25H 1/0028* (2013.01); *B25J 1/02* (2013.01); *B25J 1/12* (2013.01);
(Continued)

(58) Field of Classification Search
USPC ....... 248/123.11, 123.2, 125.7, 162.1, 406.2, 248/292.11, 297.11, 325, 331
See application file for complete search history.

(56) References Cited

U.S. PATENT DOCUMENTS 1,486,120 A * 3/1924 Bayles ................ E21B 15/006
                                                 248/648
1,524,671 A * 2/1925 Nyman .................... B66C 1/14
                                                   87/8

(Continued)

FOREIGN PATENT DOCUMENTS

DE          901882        1/1954
DE          9005779       3/1991
(Continued)

*Primary Examiner* — Alfred J Wujciak
(74) *Attorney, Agent, or Firm* — Diederiks & Whitelaw, PLC.

(57) ABSTRACT

A positionable tool support device is mounted near a work surface for supporting a tool for a user. The tool support device includes a surface mount to secure the tool support device to a support surface. A gravity-balancing articulated arm assembly is coupled to and extends from the surface mount. The gravity-balancing articulated arm assembly is selectively adjustable about both vertical and horizontal axes. A rigid support extension is coupled to the gravity-balancing articulated arm assembly for selective rotation relative to the gravity-balancing articulated arm assembly. A flexible tensile member is coupled to and extends, in a relaxed state, vertically downward from the rigid support extension. The tensile member is coupled to the tool.

23 Claims, 34 Drawing Sheets

(51) Int. Cl.
  *B25J 1/12*    (2006.01)
  *B25J 19/00*   (2006.01)
  *F16M 13/02*   (2006.01)

(52) U.S. Cl.
  CPC ........ *B25J 19/0016* (2013.01); *F16M 13/022* (2013.01); *F16M 2200/04* (2013.01); *F16M 2200/048* (2013.01); *F16M 2200/06* (2013.01); *F16M 2200/063* (2013.01)

(56) References Cited

U.S. PATENT DOCUMENTS

| | | | | |
|---|---|---|---|---|
| 2,471,793 | A | * | 5/1949 | Stull ................ B25B 23/04 81/57.37 |
| 3,016,774 | A | * | 1/1962 | Minobe ............. B25B 23/147 81/54 |
| 3,608,578 | A | * | 9/1971 | Martin ............... B23Q 1/0027 137/355.24 |
| 4,052,095 | A | | 10/1977 | Johnson |
| 4,208,028 | A | | 6/1980 | Brown et al. |
| 5,279,486 | A | * | 1/1994 | Harmon .............. A61G 7/075 248/122.1 |
| 5,498,047 | A | | 3/1996 | Treuling |
| 5,688,011 | A | | 11/1997 | Gulley |
| 5,897,104 | A | | 4/1999 | Garbiso |
| 5,974,914 | A | * | 11/1999 | Belanger ............. A43C 15/16 211/34 |
| 6,224,026 | B1 | * | 5/2001 | Dubois .............. F16M 11/041 248/118.3 |
| 6,654,987 | B1 | | 12/2003 | Wu |
| 7,618,016 | B2 | | 11/2009 | Brown |
| 8,540,196 | B1 | * | 9/2013 | Hodson ............... F16L 3/012 248/121 |
| 8,662,318 | B1 | * | 3/2014 | Caporale-Colon ....... A45F 5/00 211/34 |
| 2002/0166241 | A1 | * | 11/2002 | Helinski ............ B25H 1/0028 30/296.1 |
| 2003/0024294 | A1 | | 2/2003 | Ouimet |
| 2005/0036879 | A1 | | 2/2005 | Jhaveri et al. |
| 2006/0126167 | A1 | | 6/2006 | Piontkowski |
| 2007/0114141 | A1 | | 5/2007 | Mikesell et al. |
| 2007/0237572 | A1 | | 10/2007 | Thiessen |
| 2015/0211678 | A1 | | 7/2015 | Bulka |
| 2015/0316204 | A1 | | 11/2015 | Doyle |
| 2016/0095420 | A1 | | 4/2016 | Moreau et al. |
| 2017/0217009 | A1 | | 8/2017 | Angold et al. |

FOREIGN PATENT DOCUMENTS

DE      10222077      10/2003
GB        814662       6/1959

* cited by examiner

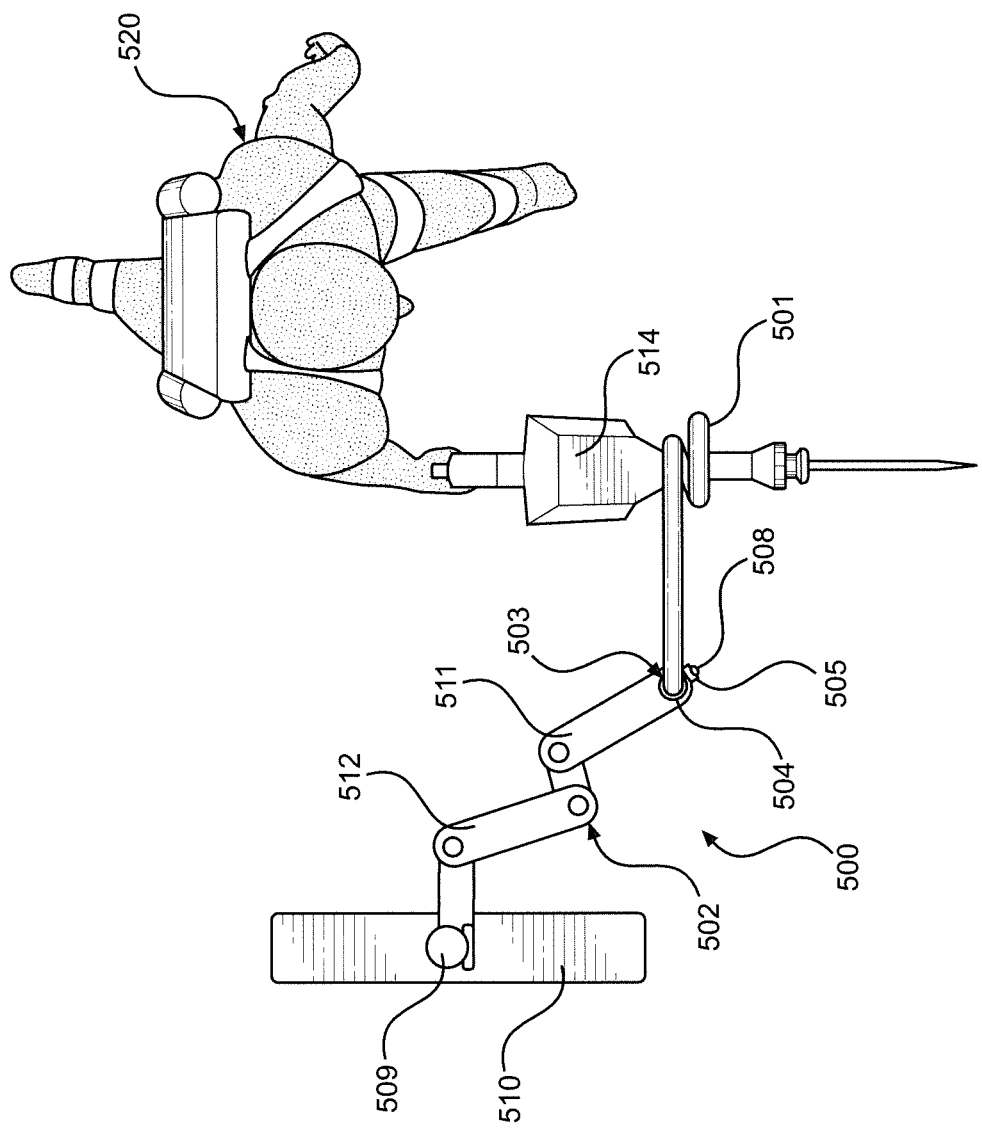

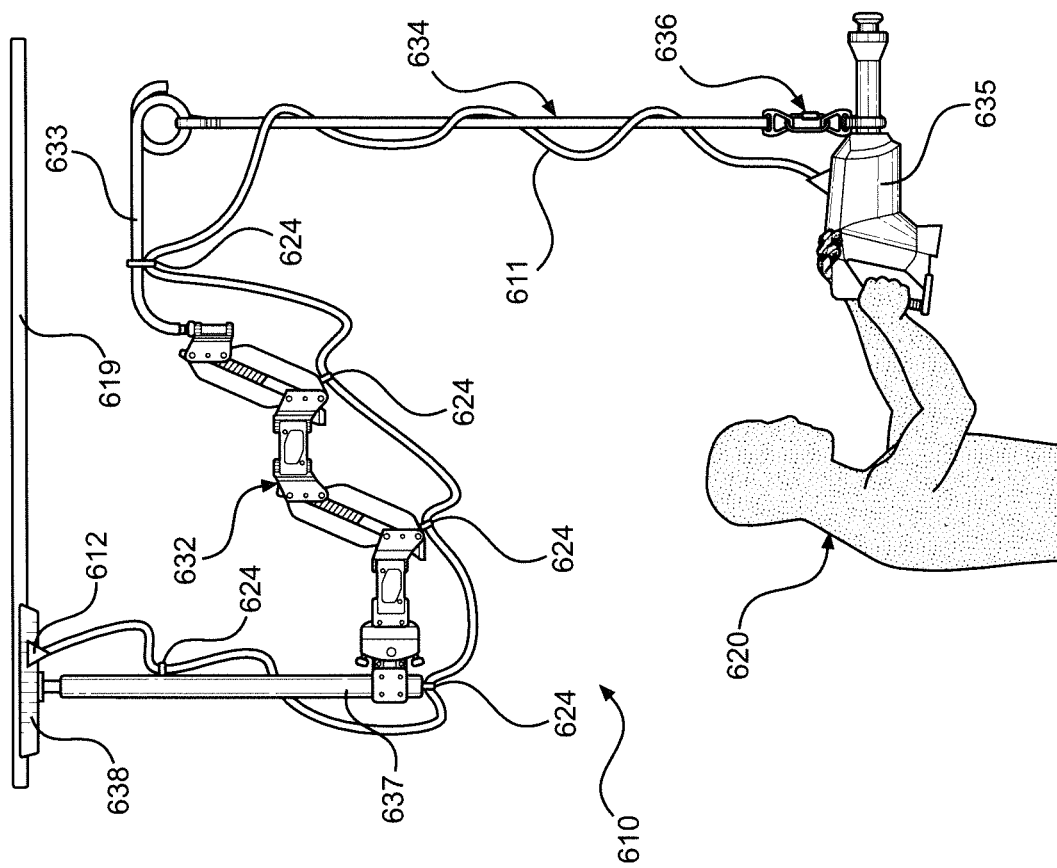

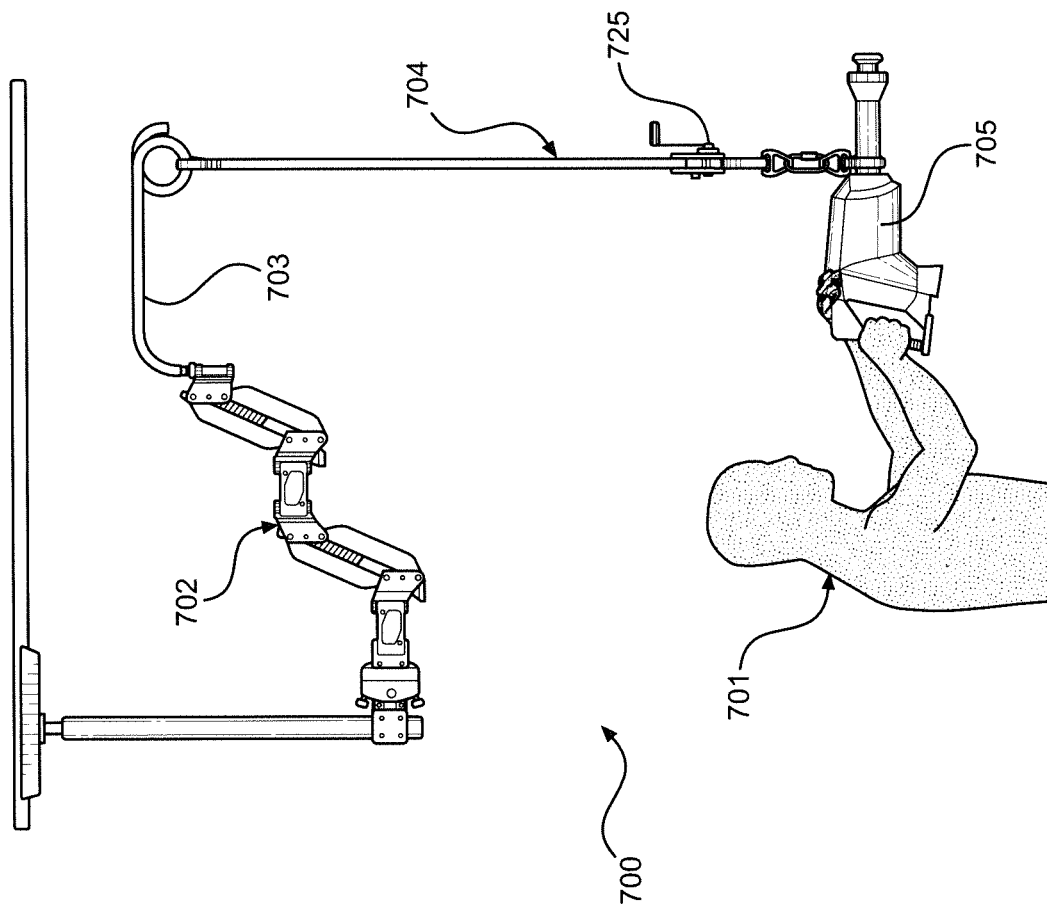

DEVICES FOR THE SUPPORT OF TOOLS

CROSS REFERENCE TO RELATED APPLICATIONS

This application represents a National Stage Application of PCT/US2017/051451, filed Sep. 14, 2017 and titled "Devices for the Support of Tools", which claims the benefit of U.S. Provisional Application No. 62/394,542, which was filed on Sep. 14, 2016 and titled "Devices for the Support of Tools". The entire content of these applications are incorporated herein by reference.

BACKGROUND OF THE INVENTION

The present invention relates to various methods of securing and suspending tools from a tool post by means of a sling. This tool support system accommodates tools of different sizes and includes various methods of configuring the support apparatus to lessen the strain and weight experienced by workers who are moving, rotating or holding such supported tools while performing tasks during their work activities. The support structure augments a worker's ability to hold, position and operate industrial tools, increasing performance and aiding in the prevention of worker injury during the execution of certain strength-requiring tasks involving heavy industrial tools. More particularly, the present invention relates to an unpowered support system suitable for use by a person engaging in heavy tool operation. In the preferred embodiment, this support system is used with a non-anthropomorphic articulated arm and a specially designed tool post to suspend and support the weight of any of a variety of different industrial tools, with the support system providing benefits including, but not limited to, greater worker strength and endurance while using and operating such industrial tools. With various interchangeable slings and different sewing, anchoring and knotting designs and techniques, the support structure can be used on numerous types of tools.

Workers in construction and manufacturing industries often must carry, lift, hold and support heavy machinery and tools while performing their work. Such lifting and strenuous activities can exhaust workers' strength and stamina and put workers at risk for acute as well as repetitive-activity injuries. To ameliorate and surmount these problems, businesses are beginning to employ gravity-balancing articulated arms that can offload the weight of these tools. Although such arms are not an object of this invention, it is important to understand that these gravity-balancing arms can connect a heavy tool to a support base in a way that a worker can move the tool without bearing the weight of the tool.

Examples of gravity-balancing articulated arms are described in U.S. Pat. Nos. 4,208,028 and 7,618,016. Gravity-balancing articulated arms, such as those used to support medical x-ray devices or motion picture cameras, use a system of springs with the spring forces being set such that the downward directed force resulting from the weight of the object attached to the arm (e.g., a motion picture camera) is exactly balanced by an upward directed force exerted by the springs. This results in the object supported by the arm being "weightless" and holding a position in space along the working range of the articulated arm. A person can then rotate and/or move the supported object into another position along the working position of the arm without this person having to counteract the weight of the supported object (although it should be noted that the person still must overcome momentum of the supported object; gravity is compensated for by the arm but mass is not).

At present, the gravity-balancing arm, tool holder and tool are attached to and are part of a T-shaped mount, called the Ekso Works® Aerial System (U.S. patent application Ser. No. 15/420,309, which is incorporated herein by reference). The Ekso Works® Aerial System mounts and clamps on to the top and middle rails of an aerial work platform (AWP). The tool is attached to the gravity-balancing arm by a multi-axis tool holding-gimbal or similar mechanical device. When secured in place, the resultant configuration takes all the weight or load of a tool and enables the worker to position and operate the tool, controlling the activity, angle and direction as needed for the work environment and situation. In another embodiment, the arm, tool holder and tool can be attached to scaffolding, a table, rolling cart or some other structure, device, vehicle or item that would enable a worker to use and adjust the tool in spaces and locations where a worker needs to perform such work activity.

The Ekso Works® Aerial System enables a worker to position a tool and keep it in place while activating the tool's power utility (such as drilling, sanding, chipping, etc.) without the effort and fatigue commonly associated with holding and operating a heavy industrial tool. During normal operations, the device, tool-holding arm, and tool holder transfer the vertical force required to hold the tool through the Ekso Works® Aerial System and mounting structure rather than through the worker's arms and body.

Depending on the relative positioning of the person, tool, gravity-balancing arm, and gravity-balancing arm mounting point, in some configurations the gravity-balancing arm may interfere with the movement of the person using the tool, or the movement of the gravity-balancing arm may be blocked by the person or work surface. It was seen that there existed an unmet need to provide a device that connects the gravity-balancing arm to the tool in such a way that the tool, person and work surface would be at a greater distance from the gravity-balancing arm to allow better maneuverability in certain work tasks.

The gravity-balancing arm, and any attached tool holder (such as a gimbal), is a complex mechanical device. Certain tool use tasks, such as grinding, drilling or jackhammering, produce substantial amounts of dust and grit in direct proximity to the tool and gravity-balancing tool support system. This dust and grit can interfere with the function of the gravity-balancing arm and/or tool-holding gimbal and can lead to wear and failure of these mechanical devices. Similarly, other dirty work environments may subject these mechanical devices to other deleterious exposures (e.g., splash or corrosive aerosols). While devices, such as flexible covers, have been developed to reduce dust and other exposure to the mechanical systems of gravity-balancing arms and tool mounts, removal of sensitive systems from the immediate work area of the tool is desirable in some situations. It was seen that there existed an unmet need to provide a device that connects the gravity-balancing arm to the tool in such a way that the tool, person and work surface would be at a greater distance from the gravity-balancing arm to reduce the exposure of the mechanical systems for the gravity-balancing arm to workspace-related environmental hazards.

Certain workspaces, such as inside a vertical mining shaft or at the bottom of a liquid storage tank, do not have readily available mounting surfaces for a gravity-supporting arm near certain work areas. It was seen that there existed an unmet need to provide a device allowing a gravity-balancing arm to be mounted well above the location of the supported tool.

SUMMARY OF THE INVENTION

It is the primary object of the present invention to provide a device that allows for a gravity-balancing arm to support the weight of a tool in such a way as to enable the tool to be at a greater distance from the links of the gravity-balancing arm, allowing greater range of tool and tool-operator movement and facilitating certain tool use tasks without compromising either the ability of the gravity-balancing arm to make the tool "weightless" for a tool operator or the range of motion of the tool.

It is an additional object of the present invention to provide a device that allows for a gravity-balancing arm to support the weight of a tool in such a way as to enable the tool to be at a greater distance from the links of the gravity-balancing arm, reducing the exposure of sensitive mechanical components to environmental contaminants or tool use hazards.

It is an additional object of the present invention to provide a device that allows for a gravity-balancing arm to support the weight of a tool in such a way as to allow the tool to be suspended by a gravity-balancing arm placed substantially above a worker, granting the worker the benefits of the gravity-balancing arm in a work environment that would not be suitable for mounting a gravity-balancing arm.

Concepts and prototype devices were developed to utilize a support post that extends upwards and away from the tool mount of a gravity-balancing arm as a mounting point for a tensile member that supports the weight of a tool, with the height and length of the support post and the length of the tensile member determining the distance of the tool to the gravity-balancing arm, and with the tool supported by the tensile member being rotatable at the end of the tensile member.

Concepts and prototype devices were further developed to utilize various types of slings made from high-strength and flexible material, including but not limited to synthetic webbing, as the tensile member suspending the tool from the tool post that is affixed to the gravity-balancing arm.

Concepts were further developed to utilize multiple slings to act as a sling assembly for supporting tools from a tool post, with various slings acting as suspension tensile members, tool support harnesses or as non-support members to secure the position of the support sling to the tool.

Concepts and prototype devices were further developed to utilize connectors to selectively couple and decouple the tools to the support slings suspending the tool from the tool post that is affixed to the gravity-balancing arm.

Concepts and prototype devices were further developed to utilize swivel devices in tandem with connectors to prevent twist from forming in slings upon suspended tool rotation relative to the tool and gravity-balancing arm.

Concepts and prototype devices were further developed to utilize clamps to secure the tools to the support slings suspending the tool from the tool post that is affixed to the gravity-balancing arm.

Concepts and prototype devices were further developed to utilize a pin-lock device, or a similar selectively locking device, to fix the position of the tool support arm relative to that of the terminal link of the gravity-balancing arm.

Concepts were further developed to mount the gravity-balancing arm and tool support arm on a movable track attached to a surface above the worker utilizing a sling-suspended tool.

Concepts were further developed to provide power to a tool by routing a power conduit, including but not limited to electrical or compressed air sources, from the mount of the gravity-balancing arm, along the tool support arm, down the sling and to the supported tool.

Concepts were further developed to provide a mechanism, such as a ratchet or winch, by which the length of the sling can be adjusted while still affixed to a tool support arm attached to a gravity-balancing arm.

Concepts were further developed to support a tool using two slings, each affixed to separate tool support posts, with the tool support posts being attached to a gravity-balancing arm, and with the length and attachment point on the tool of each sling affecting the range of motion of the tool.

Disclosed herein are novel devices that allow for supporting a tool with a gravity-balancing arm by means of suspending the tool from a tensile member that is affixed to an extension from the gravity-balancing arm. The present invention utilizes a number of different slings made out of synthetic webbing that are used in tandem with a specially designed tool post to secure and suspend power tools. Different slings are used with different types of power tools. A sling can be an endless loop or can comprise different sections of webbing that are sewn together or connected by means of buckles or fasteners. A sling is looped around or connected to a tool in such a way that the tool can be secured and then suspended from the specially designed tool post. This invention enables a worker to operate and position the tool without having to hold and support the weight of the tool and support apparatus.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE FIGURES

FIG. 11B is a drawing showing a person using a tool suspended by a sling from a gravity-balancing arm and tool support post, with the angle terminal link of the gravity-balancing arm being fixed relative to that of the tool support post in the axial plane, representing the device of the ninth embodiment of this invention.

FIG. 13 is a drawing showing a person using a tool that is suspended from a long tensile member affixed to a gravity-balancing arm and tool support post, with the gravity-balancing arm and tool support post being mounted on a surface or movable track above the person, and with a tool power cord being guided from the surface above the person to the tool along the length of the gravity-balancing arm, tool support post and sling, representing the device of the eleventh embodiment of this invention.

FIG. 14A is a drawing showing a person using a tool that is suspended from a long sling affixed to a gravity-balancing arm and tool support post, with the gravity-balancing arm and tool support post being mounted on a surface or movable track above the person, and with a ratchet on the lower portion of the sling allowing the sling length to be adjusted, representing the device of the twelfth embodiment of this invention.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. In addition, the terms "horizontal" and "vertical" are defined as including a margin of error of +/−5° such that a surface need not be perfectly horizontal, for example.

Figure 1A:
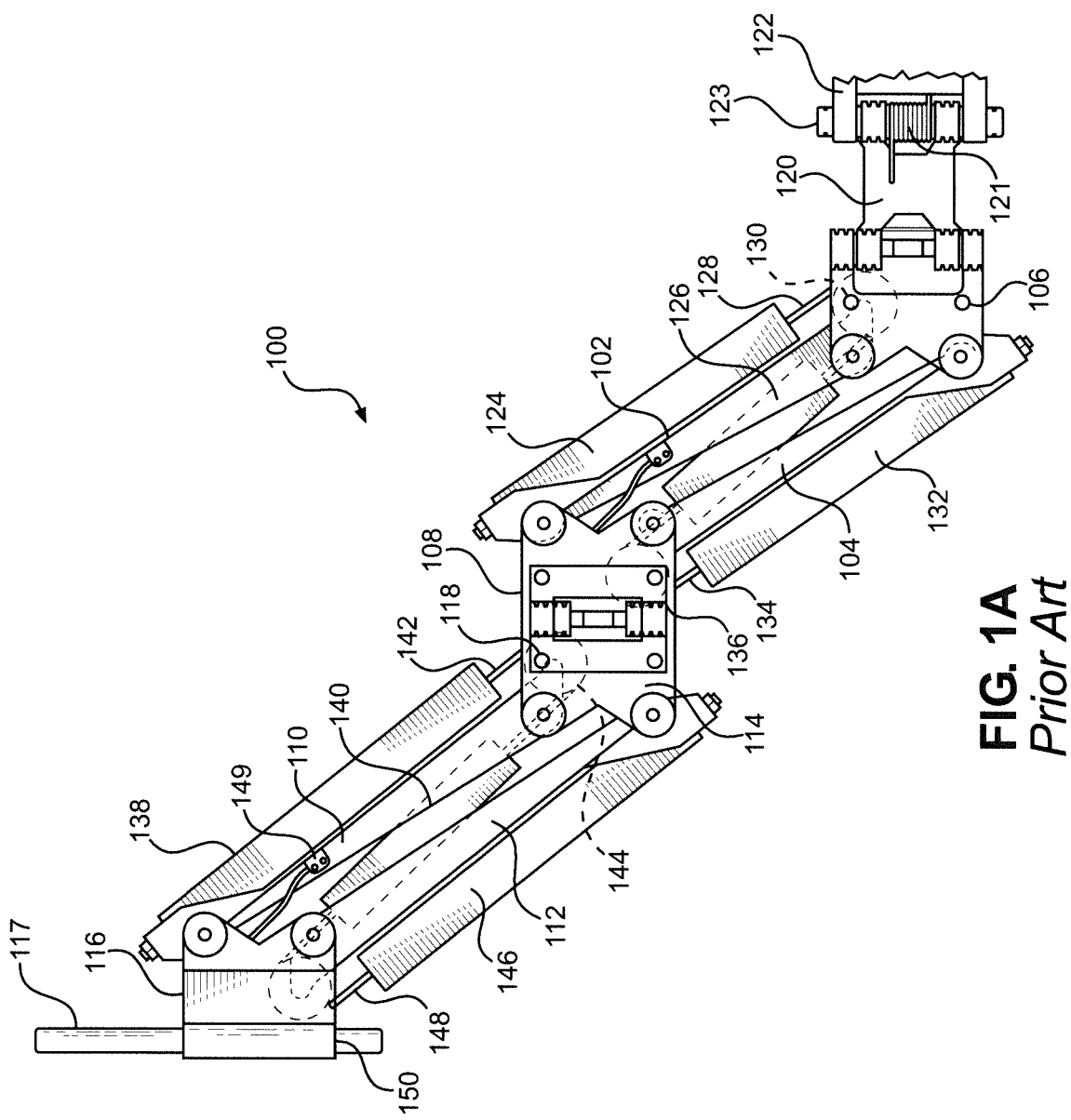
FIG. 1A is a drawing showing a prior art non-anthropomorphic gravity-compensating support arm, adapted from U.S. Pat. No. 7,618,016.
Figure 1B:
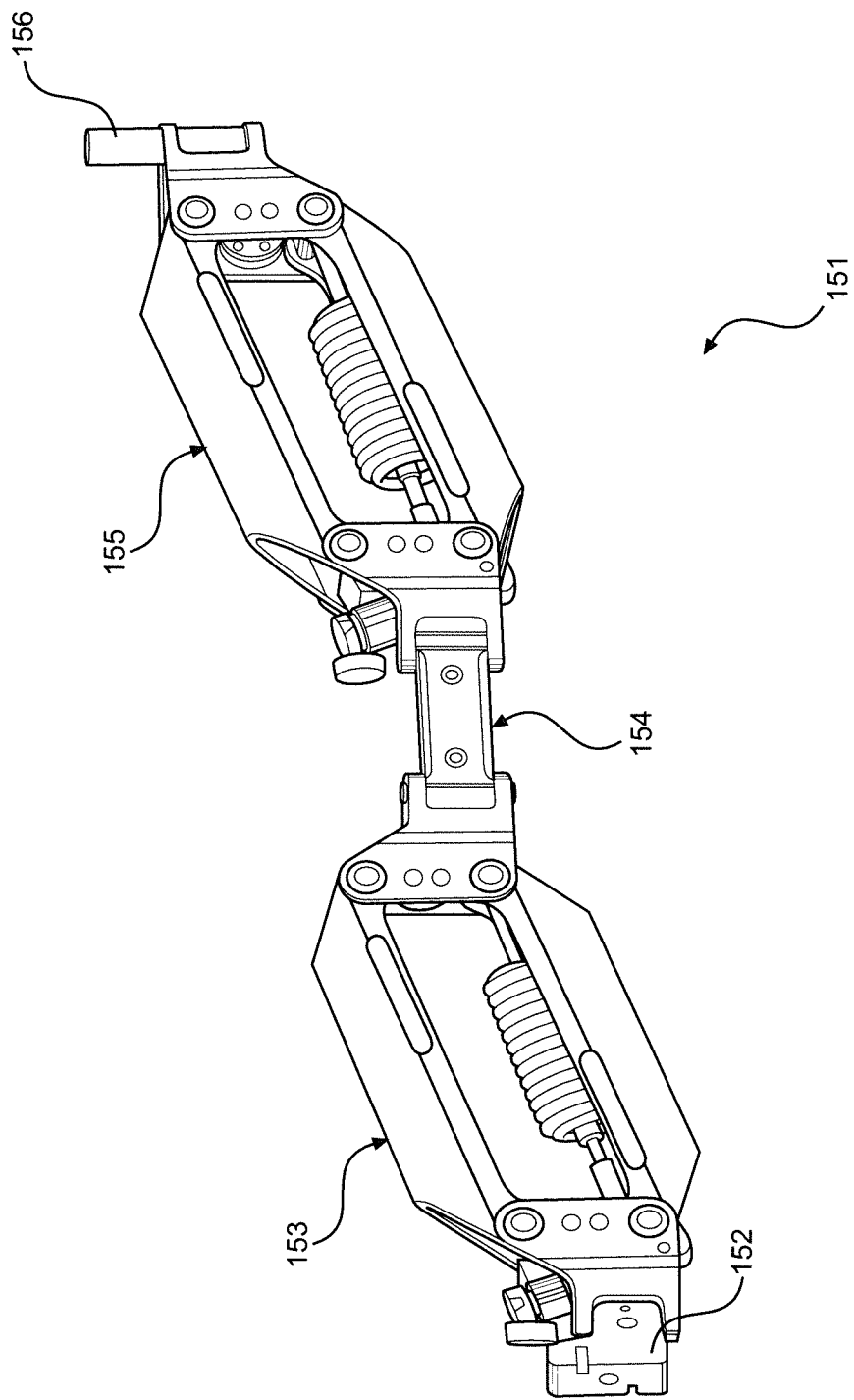
FIG. 1B is a drawing showing a newer design of a complete, two-segment gravity-compensating tool-holding arm according to the prior art.

FIGS. 1A and 1B are an illustration of a support apparatus of the prior art (see U.S. Pat. Nos. 4,208,028 and 7,618,016, which are incorporated herein by reference), which the inventor originally devised to obtain stabilized motion picture film and video images and which was offered for sale under the name Steadicam®. As illustrated, the support arm for the apparatus 100 includes a pair of parallel upper arms links 102, 104, which are pivotally coupled at one end to a connector hinge bracket 106. The other ends of the upper arm links 102, 104 are pivotally coupled to an upper arm medial hinge bracket 108. A second pair of parallel forearm links 110, 112 is pivotally coupled between a forearm medial bracket 114 and a camera support bracket 116. A camera mounting pin 117 is provided in the camera support bracket 116. The upper arm medial hinge bracket 108 and the forearm medial bracket 114 are rotatably coupled together along one side by a hinge 118. The connector hinge bracket 106 is rotatably coupled at its center to one end of a lower support hinge plate 120. The other end of the lower support hinge plate 120 is rotatably coupled to a fixed support block 122 by a pin 123. A spring 121, through which the pin 123 extends, biases the lower support hinge plate 120 in a clockwise direction. One end of a tension spring 124 is coupled to the end of the upper arm link 102, which is pivotally coupled to the upper arm medial hinge bracket 108. The other end of the tension spring 124 is coupled to one end of a tension spring 126 by a section of cable 128 that rides on and around a pulley 130, which is rotatably coupled to the upper arm link 102. The other end of the tension spring 126 is coupled to one end of a tension spring 132 by a section of cable 134 that rides on and around a pulley 136, which is rotatably coupled to the upper arm link 104. The other end of the tension spring 132 is coupled to the end of the upper arm link 104 adjacent to the connector hinge bracket 106. Similarly, one end of a tension spring 138 is coupled to the end of the forearm link 110 adjacent to the camera mounting bracket 116. The other end of the tension spring 138 is coupled to a tension spring 140 by a cable 142 that rides on and around a pulley 144, which is rotatably coupled to the forearm link 110. The other end of the tension spring 140 is coupled to one end of a tension spring 146 by a cable 148 that rides on and around a pulley 150, which is rotatably coupled to the forearm link 112. The other end of the tension spring 146 is coupled to the end of the forearm link 112 adjacent to the forearm medial hinge bracket 114.

A weight, such as a camera that is supported at the support bracket 116, behaves as an object in free space beyond gravity since the upward forces that the tension springs 124, 126, 132, 138, 140 and 146 exert, in effect, counteract gravity. The weight tends to travel in a straight line until influenced otherwise and tends to retain the same angle until influenced otherwise. As a result, the upper arm links 102, 104 roughly correspond to the upper arm of the user, and the forearm links 110, 112 roughly correspond to the user's forearm, in terms of their three-dimensional geometry, as the support arm is used high, low or to either side. The user can adjust the position of the support arm by exerting force against the tool with the user's arms, which will move the arm relative to their body. Due to the gravity-counteracting action of the support arm, the user does not bear the weight of a stationary camera/tool or support arm but rather only exerts force when changing the relative position of the support arm to the user's body. Similar support arms are known in the art and are seen in objects such as lamps or the support arms for medical x-ray devices. In some embodiments, the coil springs are replaced by gas springs or other similar devices, which serve the same role of applying a gravity-counteracting force to the weight-supporting arm. In any case, for all embodiments of the invention, the arm assembly can range from under to over gravity compensating.

FIG. 1B is a solid side representation of a complete, two-segment gravity-compensating support arm 151 of the prior art, with support body mounting hardware 152 being attached to an "upper" arm segment 153, which is attached via a hinge 154 to a "forearm" segment 155, which is adapted for connection to the payload (such as a camera) using a post 156. It should be noted that if arm 151 were inverted, post 156 and body mounting hardware 152 could simply be interchanged, and the arm would lift appropriately.

Figure 2:
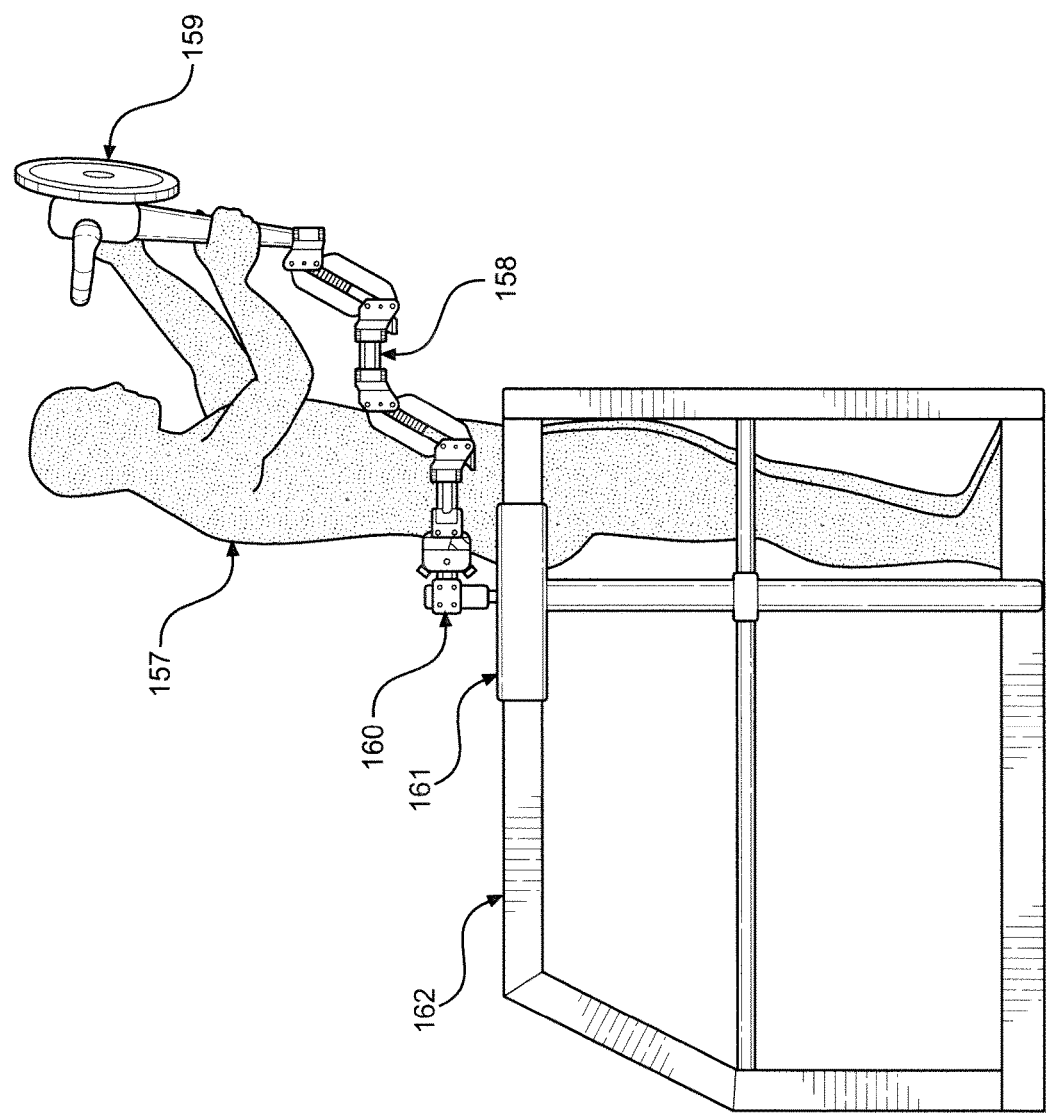
FIG. 2 is a drawing showing a person using a tool supported by a gravity-balancing arm in the prior art.

FIG. 2 shows a person 157 using a tool 159, with the weight of tool 159 being supported by a gravity-balancing arm 158 of the prior art, with gravity-balancing arm 158 being rotatably connected (in the axial plane of person 157) to a tool arm mount 161 at a pivot 160, and with tool arm mount 161 being attached to a support structure 162.

The device of the primary embodiment of this invention is shown in FIGS. 3A-D. Regarding FIG. 3A, a tool support system 200 is shown with a gravity-balancing arm (or gravity-balancing articulated arm assembly) 201 being rotatably connected to a tool support post (or rigid support extension) 202 at a linkage 207. Gravity-balancing arm 201 is rotatably connected to a mounting surface (not shown in this figure) by a pivot (or surface mount) 206. Gravity-balancing arm 201 extends upward from pivot 206 and is selectively adjustable about both vertical and horizontal axes. Tool support post 202 is comprised of an L-shaped extension 203 and a pigtail loop 204, with pigtail loop 204 being a tensile member attachment point 205.

Figure 3A:
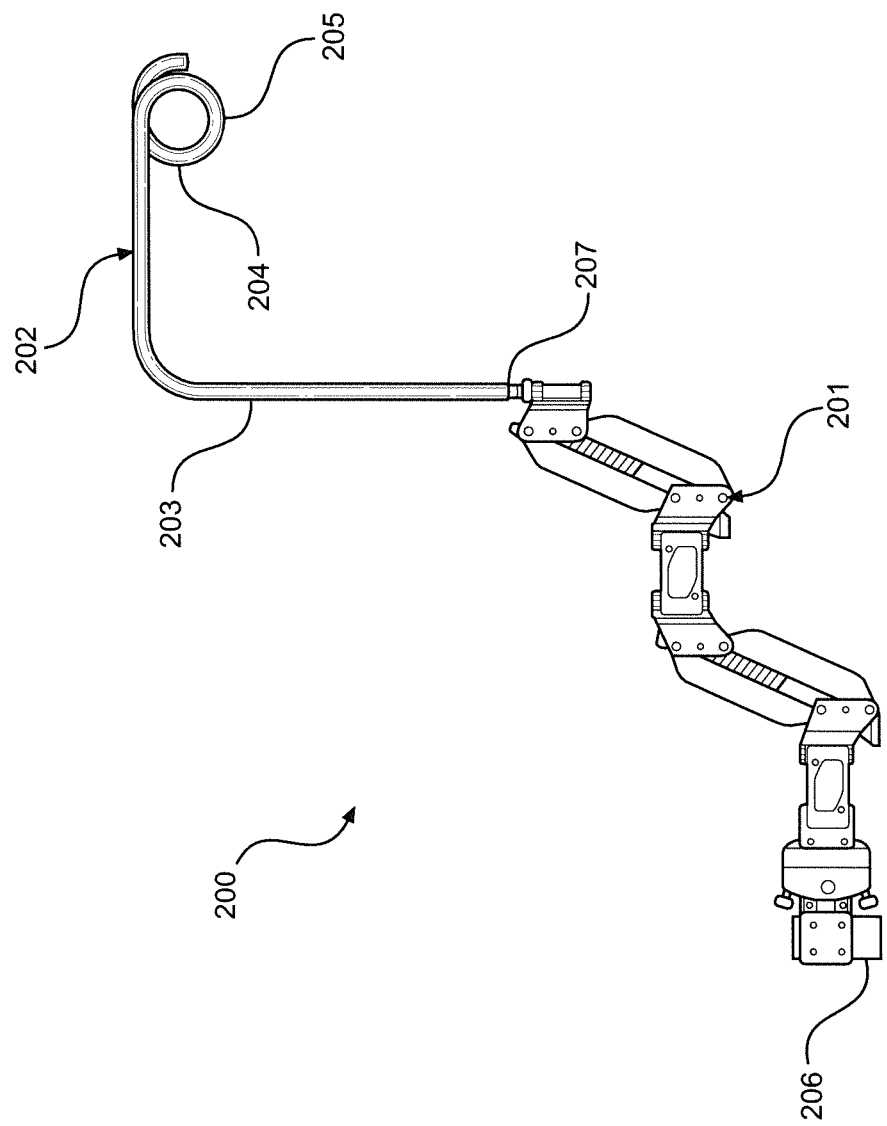
FIG. 3A is a drawing showing a gravity-balancing arm and tool support post with pigtail loop, representing one element of the device of the primary embodiment of this invention.
Figure 3B:
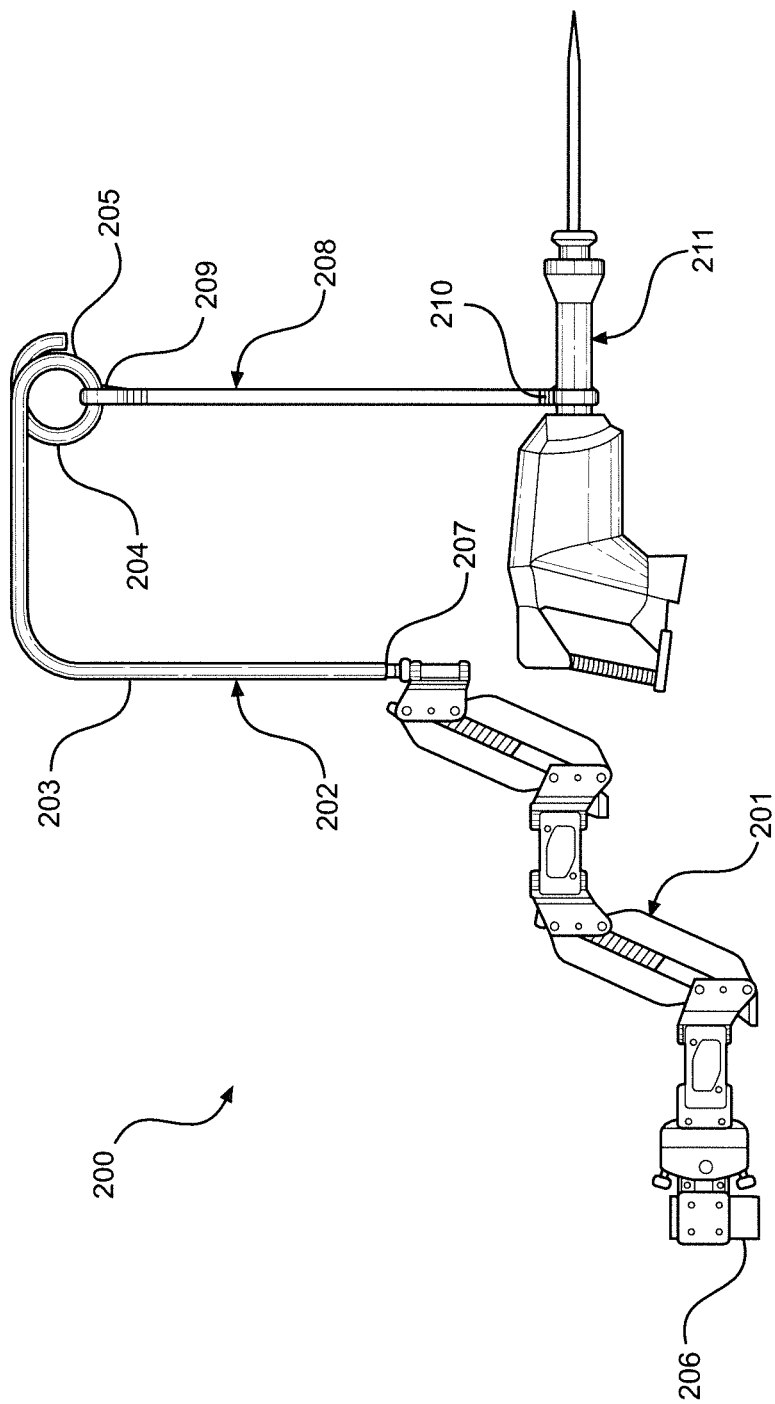
FIG. 3B is a drawing showing a tool suspended from a tensile member affixed to a gravity-balancing arm and tool support post, representing the device of the primary embodiment of this invention.

In FIG. 3B, a tool 211 is suspended from tool support post 202 at tensile member attachment point 205 by a flexible tensile member 208. Specifically, an upper connector 209 of tensile member 208 is attached to tensile member attachment point 205, and a lower connector 210 of tensile member 208 is attached to tool 211. In a relaxed state, tensile member 208 extends vertically downward from tool support post 202.

Figure 3C:
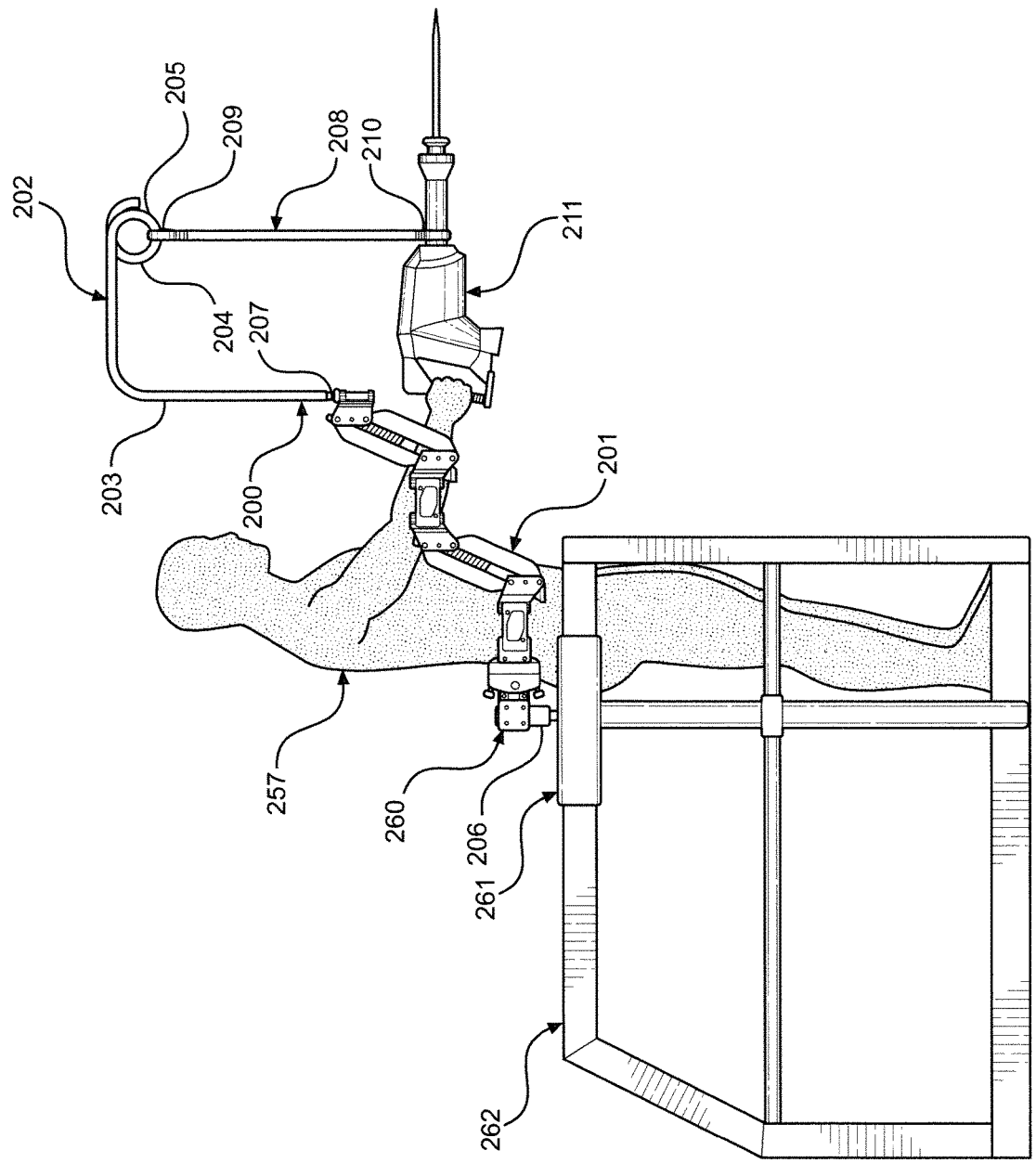
FIG. 3C is a drawing showing a person using a tool that is suspended from a tensile member affixed to a gravity-balancing arm and tool support post, representing the device of the primary embodiment of this invention, with the gravity-balancing arm and tool support post being mounted on a work surface near the person.

In FIG. 3C, a person 257 is shown using tool 211. The weight of tool 211 is supported by tensile member 208 through tool support post 202 and gravity-balancing arm 201, with this weight then being transferred through pivot 206 at a mounting brace joint 260, to a mounting brace 261 and to a mounting surface 262. Tool support post 202 extends above person 257.

Figure 3D:
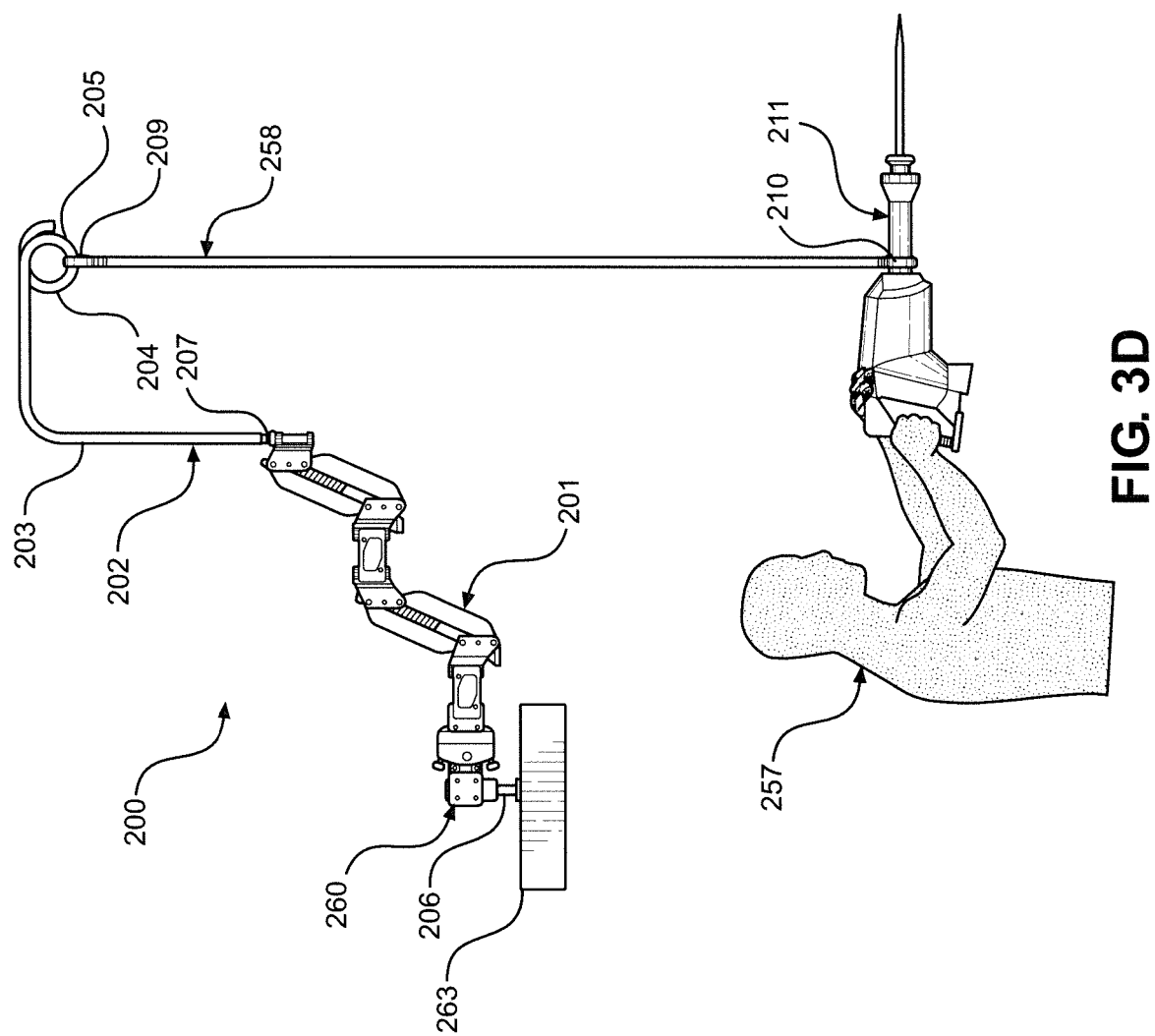
FIG. 3D is a drawing showing a person using a tool that is suspended from a long tensile member affixed to a gravity-balancing arm and tool support post, representing the device of the primary embodiment of this invention, with the gravity-balancing arm and tool support post being mounted on a work surface above the person.

FIG. 3D shows a variant configuration of this embodiment in which tool support system 200 is attached to a mounting surface 263, with mounting surface 263 being above person 257, and with a tensile member 258 being longer (relative to tensile member 208), allowing person 257 to use tool 211 while the weight of tool 211 is supported by tool support system 200.

In some embodiments, the L-shaped extension is a hollow post made from chromoly steel or other rigid, high strength materials. This hollow post is bent in a nearly L-shape and is further bent at one end in a pigtail loop. The angle for the almost L-shaped bend was determined to provide the best clearance and leveling for a secured and suspended tool. The post's pigtail loop provides an easy and secure area in which to attach and suspend each of the various tensile members and connectors used for different tools of various types, sizes and shapes. In some embodiments, the shape, size or positioning of the tool support post is modified as suited to a particular tool, user or task. In some embodiments, the pigtail loop is a hook, carabiner or other tensile member attachment mechanism. In some embodiments, the tensile member is a sling made of synthetic webbing and is either sewn, knotted, folded/doubled over and/or coupled in such a way that it can be used to secure the tool in use. In some embodiments, the length of the tensile member can be longer or shorter, as suited to the needs of the worker or task. In other embodiments, the tensile member is a webbing made from natural fiber, rope, cable, cord, chain or another tensile member known in the art. In some embodiments, the tensile member is inelastic. In other embodiments, there is some elasticity to the tensile member. In some embodiments, multiple tensile members are used. In some embodiments, fasteners and connectors are used to link the tensile members to the post, tool or additional tensile members.

As an example of the primary embodiment, consider a demolitions worker who is using a heavy drill or jackhammer to remove a section of concrete wall. Through use of the device of the primary embodiment of this invention, the heavy tool is supported for the worker during this task. The suspended tool, which is supported by the tensile member close to the tool's center of gravity, can be freely rotated by the worker at the lower terminus of the tensile member to allow tool use at variable angles. The gravity-balancing arm's adjustable positioning allows the worker to move the location of the tool (the tool's center of mass) in space, over the range of motion of the gravity-balancing arm, while the tensile member remains taut and oriented with gravity, counteracting the weight of the tool. The tool support post acts to provide clearance between the gravity-balancing arm and the tool, tensile member, worker and/or work surface. In addition, the sensitive components of the gravity-balancing arm are separated at some distance from the work surface and the dust and grit that result from the action of the tool on the concrete wall.

The primary embodiment of this invention is the generalized device of this invention in which a tool is affixed to a tensile member, with the tensile member being connected to an extension structure that is affixed to a gravity-balancing arm, and with the weight of the tool, extension and tensile member being supported by the gravity-balancing arm, resulting in a seemingly "weightless" tool that can be manipulated in space by a person. The additional embodiments of this invention are compositional variants, improvements upon or specific configurations of the device of the primary embodiment.

Figure 4A:
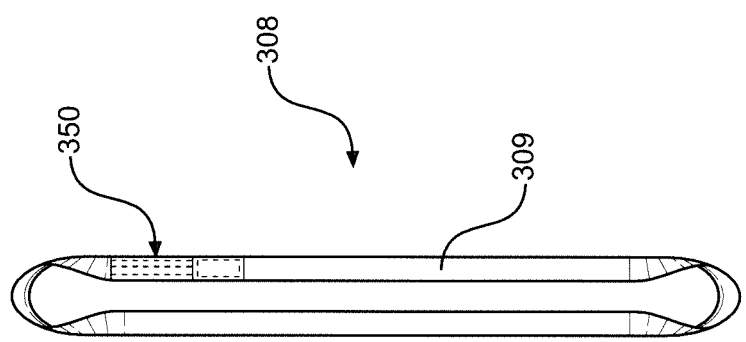
FIG. 4A is a drawing showing a loop of webbing strap (also called an "endless" or "round" sling), representing one element of the second embodiment of this invention.
Figure 4B:
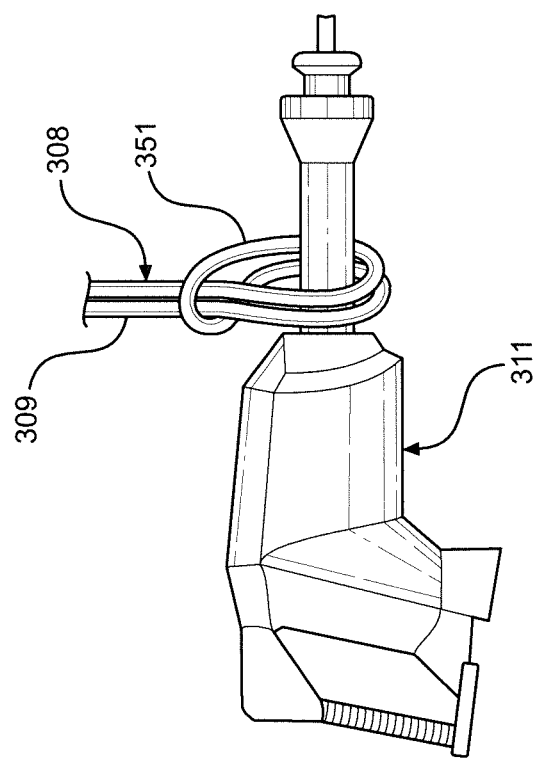
FIG. 4B is a drawing showing how a "girth hitch" (also known as a strap hitch or lanyard hitch) knot can be used to suspend a tool or object from an "endless" sling, representing one element of the device of the second embodiment of this invention, with this knot being shown loose.
Figure 4C:
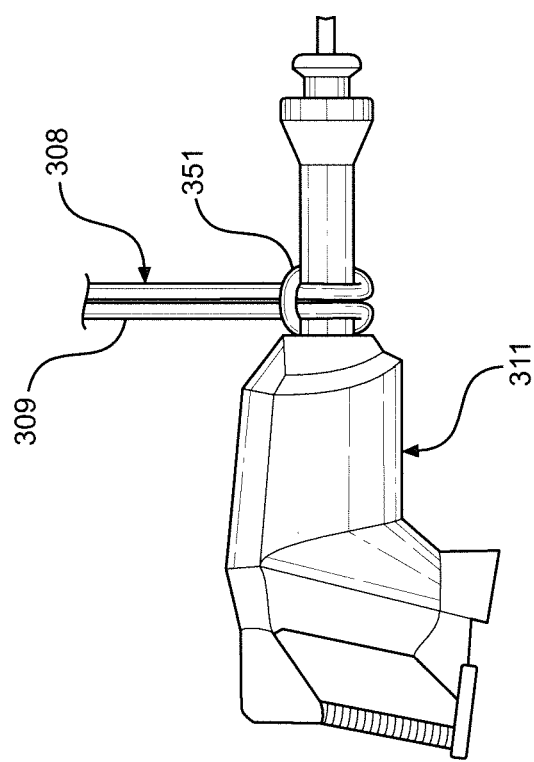
FIG. 4C is a drawing showing how a girth hitch knot can be used to suspend a tool or object from an "endless" sling, representing one element of the device of the second embodiment of this invention, with this knot being shown tight.
Figure 4D:
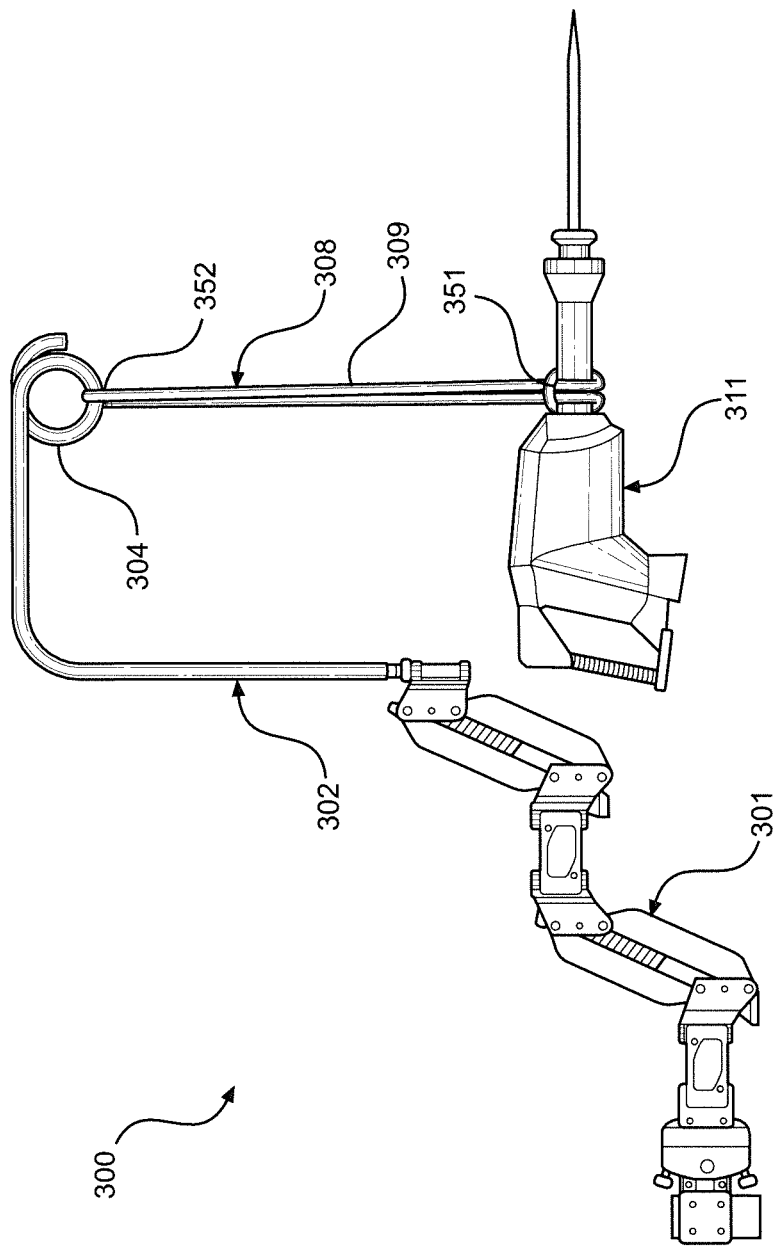
FIG. 4D is a drawing showing how a girth hitch knot can be used to suspend a tool or object from an endless sling, with this sling being supported by a gravity-balancing arm and tool support post, representing the device of the second embodiment of this invention, with this knot being shown tight.

The device of the second embodiment of this invention is shown in FIGS. 4A-D. FIG. 4A shows an "endless sling", a loop of webbing strap, with endless sling 308 as the flexible tensile member being comprised of a webbing strap 309 configured into a circle and joined at the ends by stitching 350. FIG. 4B and FIG. 4C shows how endless sling 308 can be tied around a tool 311 with a girth hitch (knot) 351. FIG. 4D shows a tool support system 300, with endless sling 308 supporting and gripping tool 311 with girth hitch 351, with a loop 352 of endless sling 308 being hung over a pigtail loop 304 of a tool support post 302, and with a gravity-balancing arm 301 connecting to tool support post 302 and supporting the weight of tool support post 302, endless sling 308 and tool 311. In some embodiments, the sling is made of rope, cable, chain or other flexible materials. In some embodiments, the ends of the sling are joined by knots or by rivets, crimps or other fasteners.

As an example of the second embodiment, consider a demolitions worker who is using a heavy drill to remove a section of concrete wall. Through use of the device of the second embodiment, this heavy drill is supported during use by the worker. If the worker wishes to change tools from a drill to a jackhammer, the device of the second embodiment allows the worker to easily remove the endless sling and the drill from the pigtail loop, loosen the girth hitch in the endless sling that is gripping the drill, loop the sling around the jackhammer in another girth hitch and then hang the sling from the pigtail loop. This allows the worker to quickly and easily change the tool supported by the gravity-balancing arm and resume work with a supported, "weightless" tool. An additional advantage of this embodiment is that no specific connectors would be required on the tool, simply a space near the tool's center of gravity to loop the sling around. A further advantage of this embodiment would be that the tool support post and sling would allow a greater range of motion in tool rotation to the worker. These devices are substantially less expensive (and are also less sensitive to dust and grit and require less maintenance) than the mechanical gimbals or similar devices that have previously been used to provide rotational freedom to tools mounted on gravity-balancing arms. It should be noted that the tools in this example would need to be approximately the same weight for the gravity-balancing arm to exactly compensate for the weight of both, although the spring tension of gravity-balancing arms can be adjusted (on the fly), as is known in the art, by a variety of mechanisms. Alternatively, weights could be added to lighter tools (or to the sling as it is looped around the tools) to normalize weight.

Figures 5A, 5B:
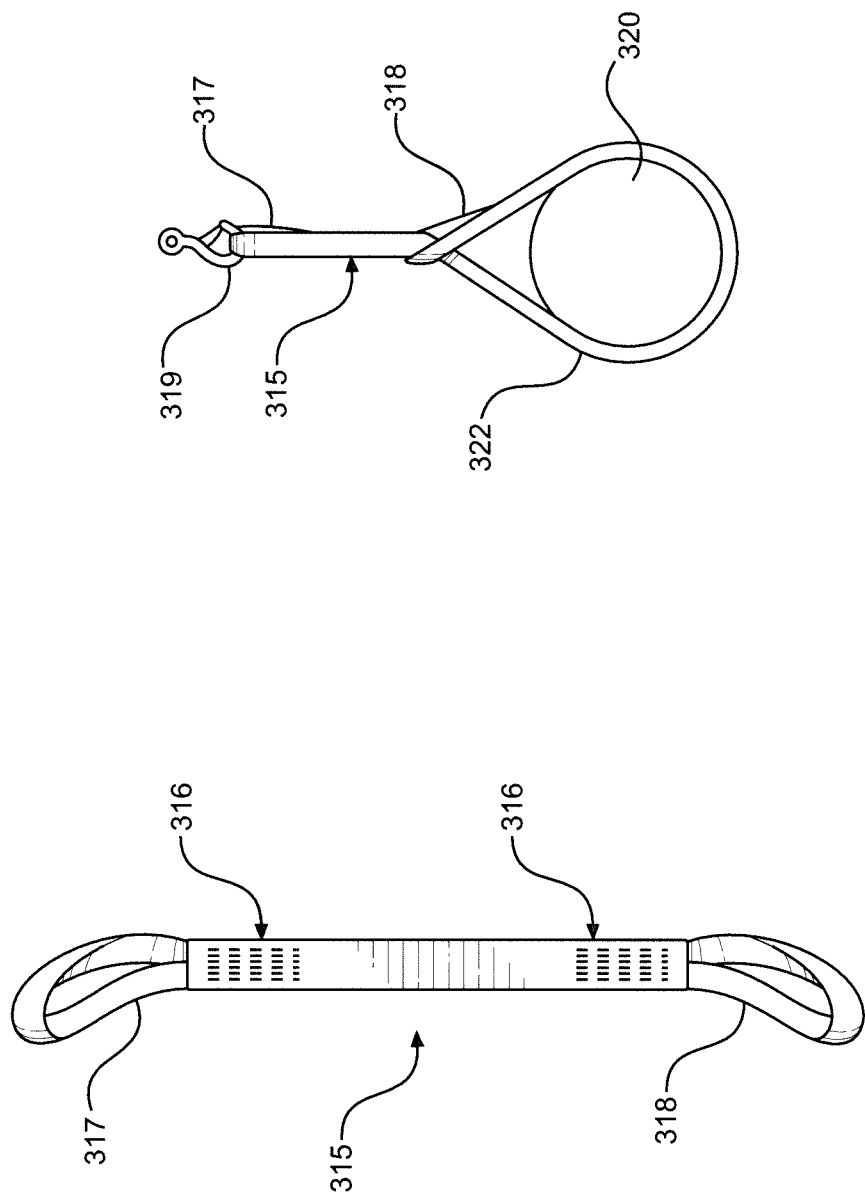
FIG. 5A is a drawing showing a webbing strap with a loop at each end (a double loop sling, often simply called a sling or a "double eye" sling), representing one element of the third embodiment of this invention.
FIG. 5B is a drawing showing how a "choker hitch" knot can be used to suspend a tool or object from a double-loop sling, representing one element of the device of the third embodiment of this invention.

The device of the third embodiment of this invention is shown in FIGS. 5A-D. FIG. 5A shows a double eye sling-type flexible tensile member 315 having an upper loop 317 and a lower loop 318, with upper loop 317 and lower loop 318 being secured by stitching 316. FIG. 5B shows how double eye sling 315 can be suspended from a hook 319 by upper loop 317 and tied around an object 320 using lower loop 318 to form a choker hitch (knot) 322, with this configuration allowing hook 319 and double eye sling 315 to support the weight of object 320.

Figure 5C:
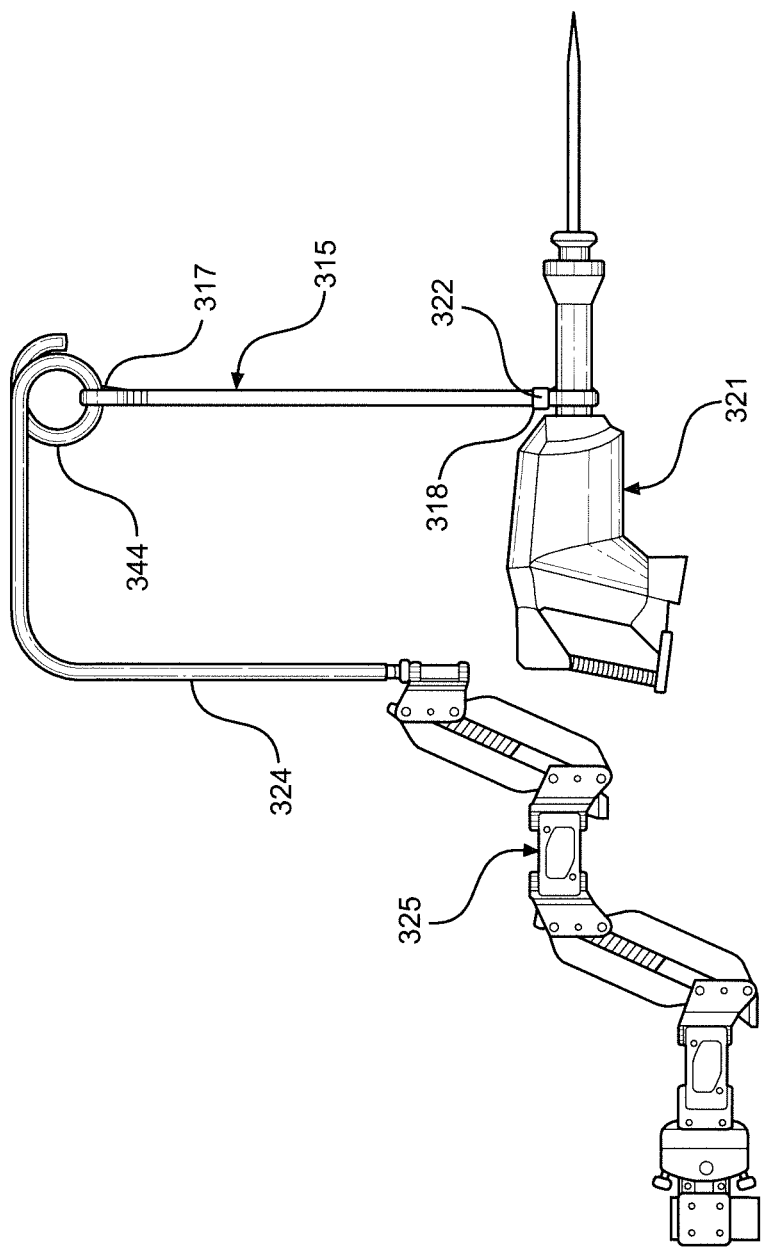
FIG. 5C is a drawing showing how a choker hitch knot can be used to suspend a tool or object from a double-loop sling, with this sling being supported by a gravity-balancing arm and tool support post, representing the device of the third embodiment of this invention.

FIG. 5C shows double eye sling 315 affixed around a tool 321 at lower loop 318 with choker hitch 322, with choker hitch 322 being formed by passing upper loop 317 through lower loop 318 and fitting the resultant knot around tool 321, and with upper loop 317 of double eye sling 315 hooking onto a pigtail loop 344 of a tool support post 324. Double eye sling 315 supports the weight of tool 321, with a gravity-balancing arm 325 supporting the weight of tool support post 324, double eye sling 315 and tool 321.

Figure 5D:
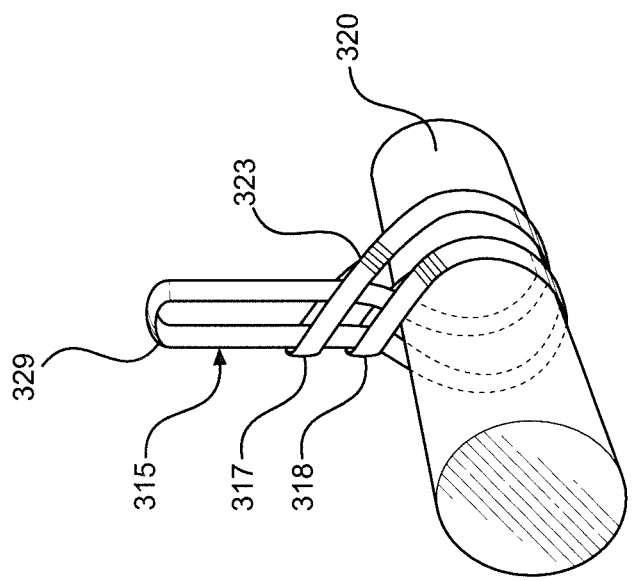
FIG. 5D is a drawing showing how a "double choker hitch" knot can be used to suspend a tool or object from a double-loop sling, representing a variant configuration of the device of the third embodiment of this invention.

FIG. 5D shows an alternative configuration of this embodiment in which a double eye sling is used to support a load with a double choker hitch (knot) 323, with double eye sling 315 being wrapped around object 320, and with a center loop 329 of double eye sling 315 passing though upper loop 317 and lower loop 318, forming the (two strand loop structure) double choker hitch that secures around object 320. This double choker hitch can then be suspended from a pigtail loop or hook at center loop 329 of double eye sling 315. Double choker hitches have the advantage of greater contact with the object being supported and more sling being under tension, increasing the stability and maximum weight of the suspended object. It should be noted that the endless loop sling of the second embodiment can also be tied into a knot similar to a double choker hitch. In addition, a single double loop sling can be used to support a tool at either of two different heights simply by a worker selectively supporting the tool with a sling in either the (single) choker hitch or the double choker hitch configurations. In some embodiments, the sling is made of webbing, rope, cable, chain or other flexible materials. In some embodiments, the ends of the sling loops are joined by knots or by rivets, crimps or other fasteners.

As an example of the third embodiment, consider a factory worker who is using a rivet setting tool to secure two objects together. Through use of the device of the third embodiment, this heavy rivet setting tool is supported during use by the worker. If the worker wishes to change tools from a rivet setting tool to a rivet buster, the device of the second embodiment allows the worker to easily remove the double eyed sling and the drill from the pigtail loop, loosen the choker hitch in the endless sling that is gripping the rivet setting tool, loop the sling around the rivet buster in another choker hitch, then hang the sling from the pigtail loop. This allows the worker to quickly and easily change the tool supported by the gravity-balancing arm and resume work with a supported, "weightless" tool. An additional advantage of this embodiment is that no specific connectors would be required on the tool, simply a space near the tool's center of gravity to loop the sling around. A further advantage of this embodiment would be that the tool support post and sling would allow a greater range of motion in tool rotation to the worker. These devices are substantially less expensive (and maintenance intensive) than the mechanical gimbals that have previously been used to provide rotational freedom to tools mounted on gravity-balancing arms. It should be noted that the tools in this example would need to be approximately the same weight for the gravity-balancing arm to exactly compensate for the weight of both, although the spring tension of gravity-balancing arms can be adjusted (on the fly), as is known in the art, by a variety of mechanisms.

Figure 6A:
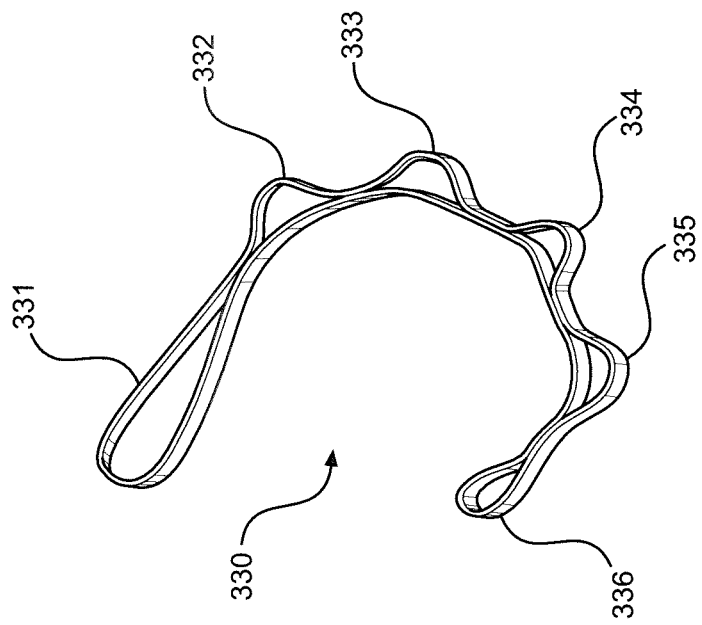
FIG. 6A is a drawing showing a webbing strap sling with multiple sewn loops along the length of the strap (a "daisy chain loop" sling), representing one element of the fourth embodiment of this invention.
Figure 6B:
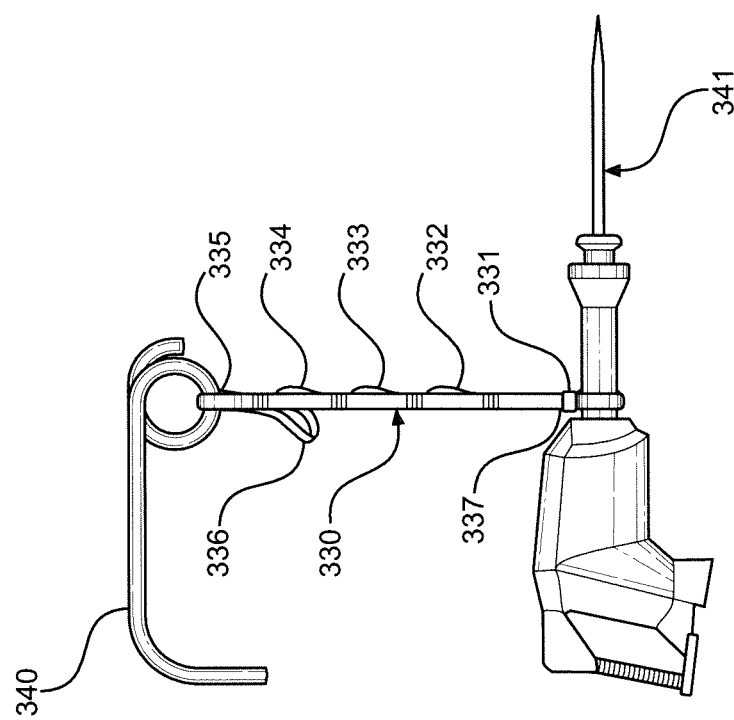
FIG. 6B is a drawing showing how a choker hitch knot can be used to suspend a tool or object from a daisy chain loop sling, with this sling being supported by a gravity-balancing arm and tool support post, representing the device of the fourth embodiment of this invention.

The device of the fourth embodiment of this invention is shown in FIGS. 6A and 6B. The sling of the fourth embodiment is similar to the sling of the third embodiment in that it is intended for use as a choker hitch support for a tool hung by an upper sling loop, but the sling of the fourth embodiment has multiple "upper" or suspension loops by which the sling can be suspended, allowing the worker to easily adjust the sling length as needed by selecting among the various suspension loops. In FIG. 6A, a daisy chain sling 330 has a choker loop 331 and suspension loops 332-336. In FIG. 6B, daisy chain sling 330 is passed through choker loop 331 of daisy chain sling 330, forming a choker hitch 337 around a tool 341. Suspension loop 335 of daisy chain sling 330 is attached to a tool support post 340, with the weight of tool 341 being transferred through daisy chain sling 330 into support post 340 and into a gravity-balancing arm (not shown in this figure). In some embodiments, the sling is made of webbing, rope, cable, chain or other flexible materials. In some embodiments, the ends of the sling are joined by knots or by rivets, crimps or other fasteners.

As an example of the fourth embodiment, consider a construction worker using a heavy tool supported by a gravity-balancing arm, tool support post and sling. Through use of the device of the fourth embodiment, this worker can easily and quickly change the sling length as needed for various work tasks by changing which suspension loop is affixed to the tool support post.

Figure 7C:
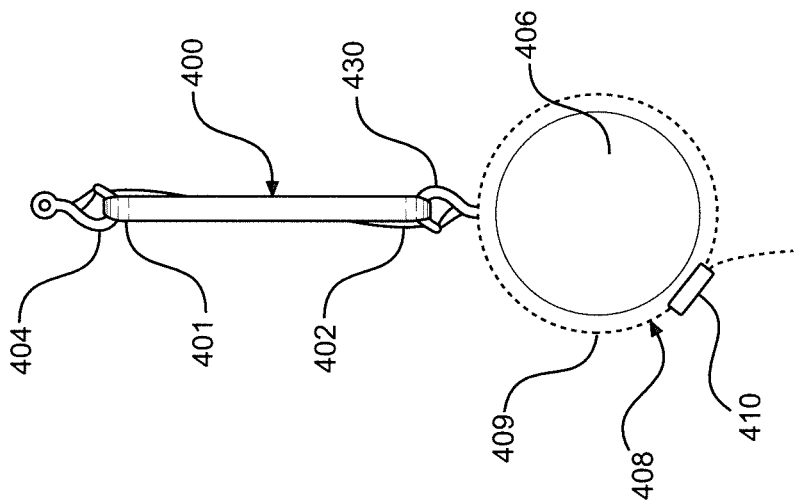
FIG. 7C is a drawing showing how a vertical hitch can be used to suspend a tool or object from a double-loop sling, with the tool or object being supported by an adjustable strap loop that envelops the tool or object, and with this adjustable strap loop having a device by which the sling can be affixed.
Figure 7B:
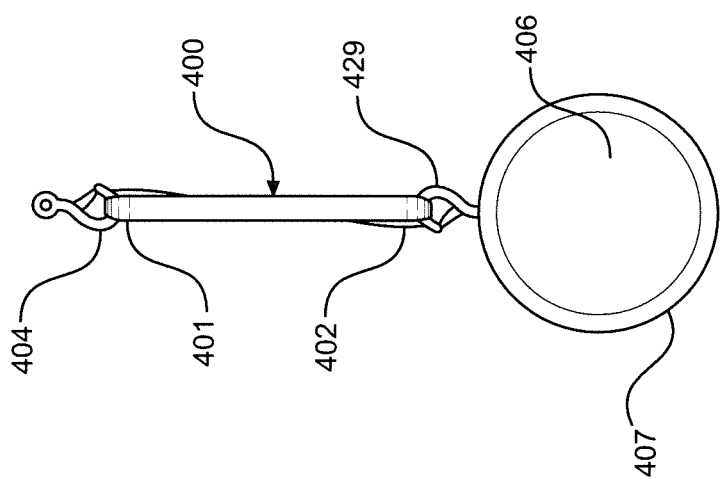
FIG. 7B is a drawing showing how a vertical hitch can be used to suspend a tool or object from a double-loop sling, with the tool or object being supported by an intermediary connector that envelops the tool or object, and with this intermediary connector having a device by which the sling can be affixed.
Figure 7A:
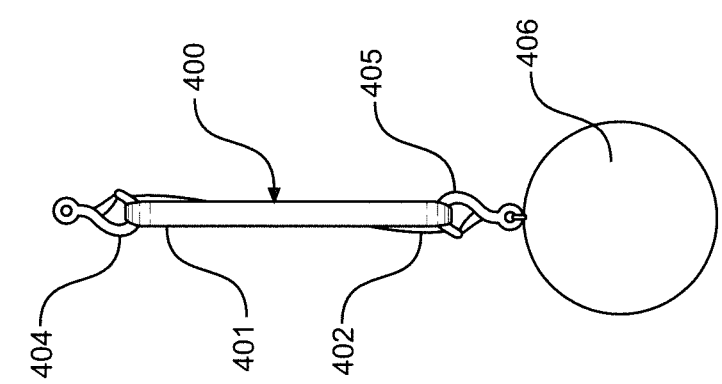
FIG. 7A is a drawing showing how a "vertical hitch" can be used to suspend a tool or object from a double-loop sling, with the tool or object having a device by which the sling can be affixed.

The device of the fifth embodiment of this invention is shown in FIGS. 7A-E. FIG. 7A shows how a double eye sling can be used as a "vertical hitch" to connect a support hook to an object being supported, the object having a device by which the sling can be affixed. In particular, an upper loop 401 of a double eye sling 400 is attached to a support hook 404, and a lower loop 402 of double eye sling 400 is attached to an object hook 405, with object hook 405 being attached to object 406, and with this connectivity allowing object 406 to be suspended from and supported by support hook 404.

In FIG. 7B, lower loop 402 is connected to a coupler hook 429, with coupler hook 429 being attached to a coupler 407, with coupler 407 encompassing object 406, and with this connectivity allowing object 406 to be suspended from and supported by support hook 404.

Figure 7D:
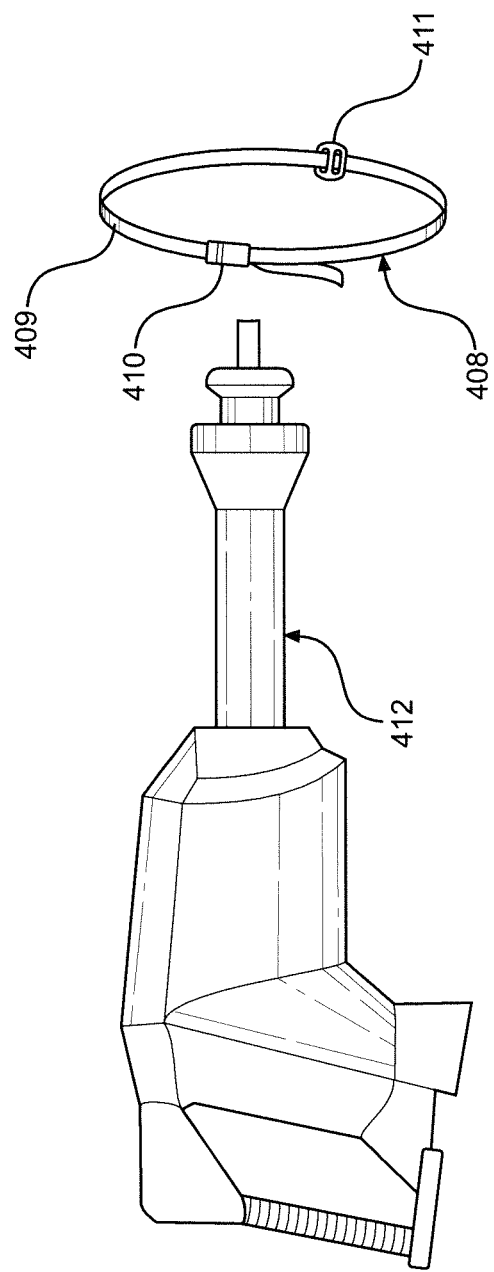
FIG. 7D is a drawing showing how an adjustable strap loop can be fitted around a tool, with this adjustable strap loop having a device by which the sling can be affixed, representing one element of the fifth embodiment of this invention.

In FIG. 7C, lower loop 402 is connected to a coupler hook 430, with coupler hook 430 being attached to an adjustable sling loop 408, with adjustable sling loop 408 having a strap 409 and a buckle 410, with adjustable sling loop 408 being configured to be tightened around and coupled to object 406, and with this connectivity allowing object 406 to be suspended from and supported by support hook 404. FIG. 7D shows how adjustable sling loop 408 can be fitted over a tool 412, with adjustable sling loop 408 also having a slide ring 411 (shown in this figure as a double eyelet ring).

Figure 7E:
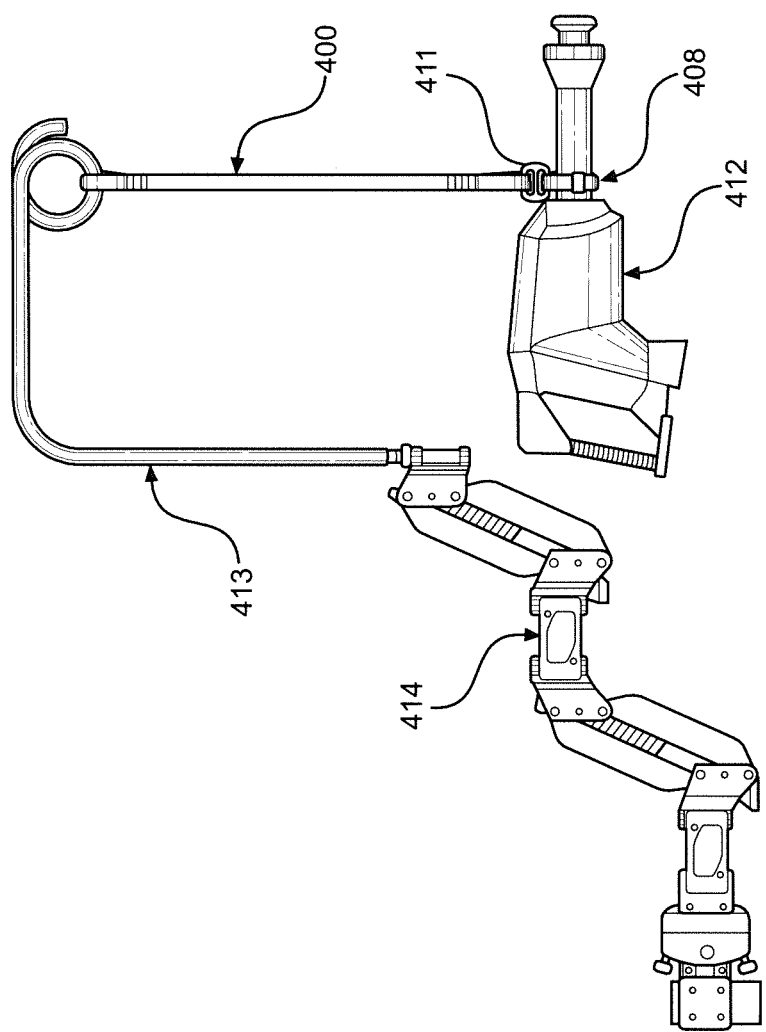
FIG. 7E is a drawing showing how a vertical hitch can be used to suspend a tool or object from a double-loop sling, with the tool or object being supported by an adjustable strap loop that envelops the tool, with this adjustable strap loop having a device by which the sling can be coupled to the strap, and with this sling being supported by a gravity-balancing arm and tool support post, representing the fifth embodiment of this invention.

FIG. 7E shows tool 412 affixed to adjustable sling loop 408, with slide ring 411 connecting to double eye sling 400, with double eye sling 400 attaching to a tool support post 413, and with tool support post 413 being connected to a gravity-balancing arm 414. Due to this connectivity, gravity-balancing arm 414 supports the weight of tool support post 413, double eye sling 400, slide ring 411, adjustable sling loop 408 and tool 412. Slide ring 411 acts as more than a simple connector between the two slings; it allows the adjustable sling loop 408 to slide relative to the nadir of double eye sling 400, allowing a worker using this to more easily employ roll while manipulating the tool (limited by the placement of the buckle). Easier roll is useful for planar-acting tools, such as a chainsaw or a rivet buster with a chisel bit. In some embodiments, the sling is made of rope, cable, chain or other flexible materials. In some embodiments, the ends of the sling are joined by knots or by rivets, crimps or other fasteners.

As an example of the fifth embodiment, consider a demolitions worker who is using a gravity-balancing arm with a tool support post and sling to support the weight of a rivet buster. Through use of the device of the fifth embodiment, the worker could more easily employ tool roll to better apply force at various angles on the work surface.

Figure 8A:
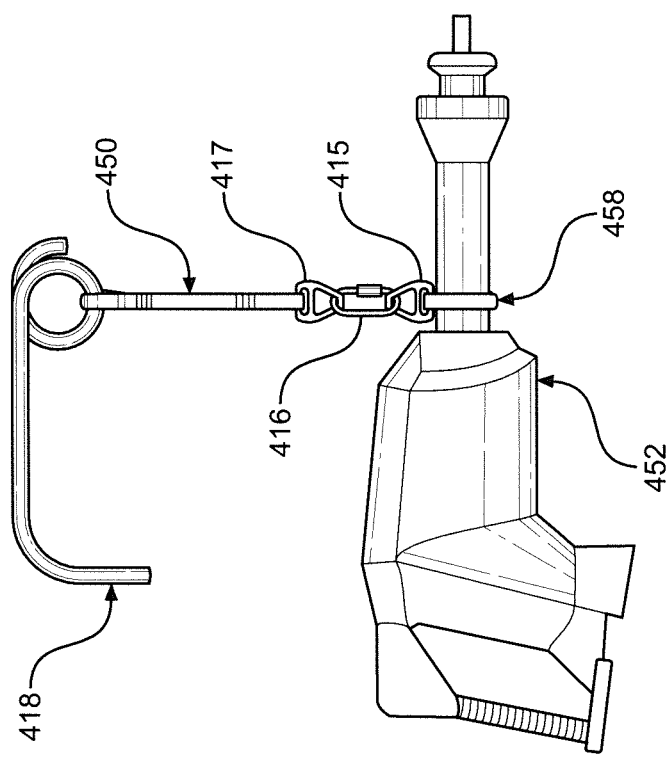
FIG. 8A is a drawing showing how a vertical hitch can be used to suspend a tool or object from a double-loop sling, with the tool or object being supported by an adjustable strap loop that envelops the tool, with this adjustable strap loop having a device by which the sling can selectively couple to the adjustable strap, and with this sling being supported by a gravity-balancing arm and tool support post, representing one element of the sixth embodiment of this invention.
Figure 8B:
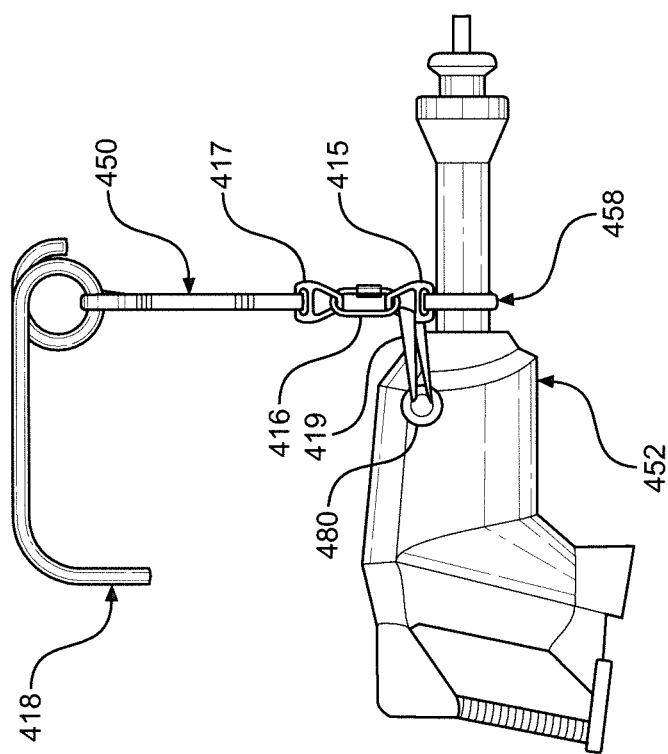
FIG. 8B is a drawing showing a vertical hitch suspending a tool from a double-loop sling, with the tool or object being supported by an adjustable strap loop that envelops the tool, with this adjustable strap loop having a device by which the sling can selectively couple to the adjustable strap, and with this sling being supported by a gravity-balancing arm and tool support post. An additional adjustable strap loop is configured in such a way as to secure the vertical hitch assembly and the tool, shown in this drawing connecting to a forward tool handle, preventing slippage or movement of the tool relative to the support sling, representing the sixth embodiment of this invention.
Figure 8C:
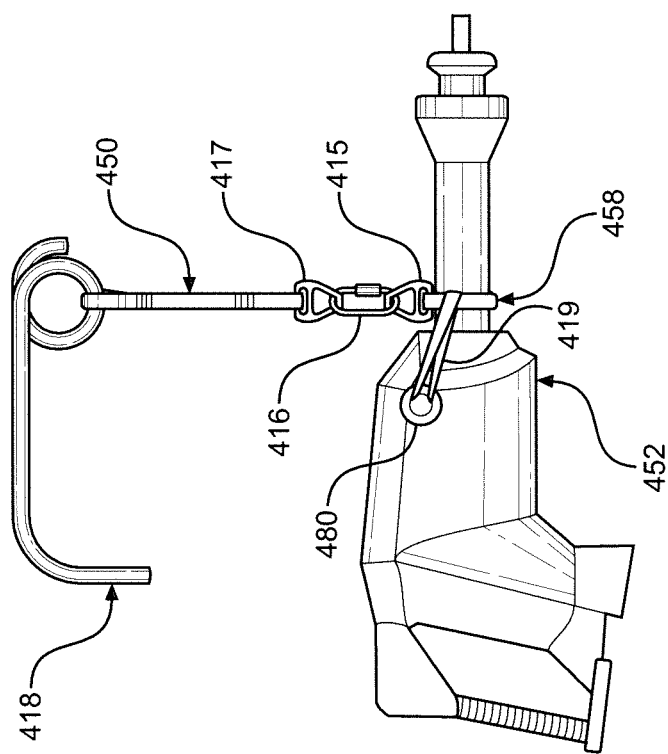
FIG. 8C is a drawing showing a vertical hitch suspending a tool from a double-loop sling, with the tool or object being supported by an adjustable strap loop that envelops the tool, with this adjustable strap loop having a device by which the sling can selectively couple to the adjustable strap, and with this sling being supported by a gravity-balancing arm and tool support post. An additional adjustable strap loop is configured in such a way as to directly secure the adjustable strap holding the tool, shown in this drawing connecting to a forward tool handle, preventing slippage or movement of the tool relative to the support sling but allowing for some tool roll to facilitate certain work tasks, representing an additional element of the sixth embodiment of this invention.

The device of the sixth embodiment of this invention is shown in FIGS. 8A-C. This embodiment adds an additional sling and/or selective connectors to the system. The purpose of this sling is to prevent a secured support sling system from sliding or otherwise changing position on the tool and to allow the tool to be more easily and securely mounted/unmounted from a support sling. FIG. 8A shows a tool 452 attached to an adjustable sling loop 458, with adjustable sling loop 458 having a slide ring 415 (shown in this figure as a D-ring with an additional slide eyelet). Double eye sling 450 is connected to a tool support post 418 though one loop of double eye sling 450, with the second loop of double eye sling 450 including a ring 417. Ring 417 and slide ring 415 are selectively coupled by a connector (or selective coupler) 416 (shown in this figure as a quick-link fastener); when coupled, the weight of tool 452 is supported by double eye sling 450 and tool support post 418.

FIG. 8B shows an additional adjustable sling (buckle not shown in this figure) to secure the position of the tool support sling assembly. An adjustable sling 419 passes though slide ring 415 and loops around a forward tool grip 452, with this preventing adjustable sling loop 458 from sliding forward on the tool. FIG. 8C shows a variant configuration of this additional adjustable sling, with adjustable sling 419 passing around sling loop 458 and looping around forward tool grip 452 at attachment 480, and with this preventing adjustable sling loop 458 from sliding forward on the tool. This variant configuration is preferred in some embodiments as it allows for greater tool roll. In some embodiments, the connector is a carabiner, push disconnector or any of a number of selective coupling devices known in the art. In some embodiments, the third sling is affixed to locations on the tool other than a forward handgrip. In some embodiments, the additional sling is affixed directly to a double eye or continuous sling, rather than the two-part sling of the fifth embodiment. In some embodiments, additional adjustable slings (more than three total slings) are used to better secure the position of the tool support sling assembly. In some embodiments, this third sling could be a rope, cable or nylon zip tie. This arrangement also highlights a general aspect of the invention wherein the tool employed with the positionable tool support device will often include a handle portion configured to be grasped by the user, an opposing end portion carrying a work implement, and an intermediate body portion, i.e., the remainder of the tool extending between the handle portion and the opposing end portion. Regardless of one or more additional attachments to other portions of the tool, the tensile member is preferably coupled to the tool at the intermediate body portion. This arrangement provides for superior maneuverability and balancing of the tool for the user.

As an example of the sixth embodiment, consider a demolitions worker using a jackhammer supported by a gravity-balancing arm, tool support post and sling in a horizontal tool configuration to remove a section of concrete. The tool and sling will be subject to vibration over the course of tool use, potentially leading to a slippage of the tool support sling, which may result in a misbalancing of the tool or even dropping of the tool, potentially resulting in work delays or tool damage. Through use of the device of the sixth embodiment, the tool is securely connected to the support sling system unless deliberately decoupled by the worker. In addition, the inclusion of selective couplers allows the adjustable slings affixed to the tool to be left in a tight position when changing tools, reducing worker time and effort and minimizing the risk of poorly secured tools.

Figure 9:
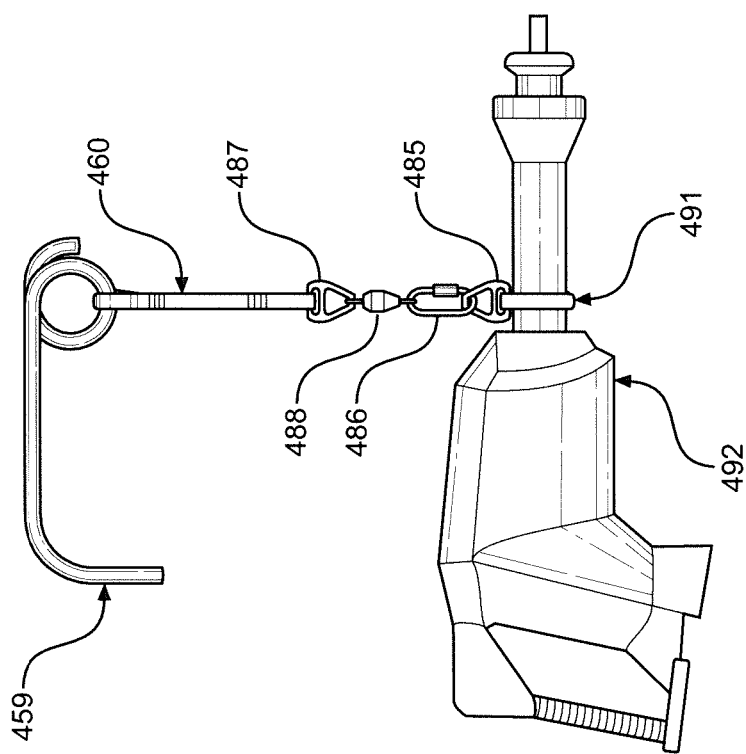
FIG. 9 is a drawing showing a vertical hitch suspending a tool from a double-loop sling, with the tool being supported by an adjustable strap loop that envelops the tool, with this adjustable strap loop having a swivel device and a device by which the sling can selectively couple to the adjustable strap, and with this sling being supported by a gravity-balancing arm and tool support post, representing the seventh embodiment of this invention.

The device of the seventh embodiment of this invention is shown in FIG. 9, in which a relief device prevents support sling twist. FIG. 9 shows the addition of a ball bearing swivel 488 (such as those used in deep sea fishing) between a ring 487 and a connector 486. Connector 486 is attached to a ring 485, with ring 485 being connected to an adjustable sling 491, and with a tool 492 being affixed to adjustable sling 491. Ball bearing swivel 488 allows tool 492 to rotate freely in space relative to a tool support post 459 and a double eye sling 460 without resulting in twist forming in double eye sling 460. This swivel device can rotate continuously (in the axial plane of a worker using the tool), preventing the development of twist in either direction. In some embodiments, the swivel is placed between the tool support post and the top of the sling. In some embodiments, various other connectors with swivels are used (such as push button, quick-detachable sling swivels, which are commonly used in firearm support slings).

As an example of the seventh embodiment, consider a demolitions worker who is using a gravity-balancing arm with a tool support post and sling to support the weight of a rotary hammer. It may be most efficient for this worker to walk in circles around the object on which they are using the tool, which would result in increasing twist of the support sling unless the worker walked back in the other direction or otherwise unwound the twist intentionally. Twisting a strap not only shortens the length but, at higher levels, can result in wear and a weakening of strap strength and weight capacity. Through use of the device of the seventh embodiment, sling twist is not developed.

Figure 10A:
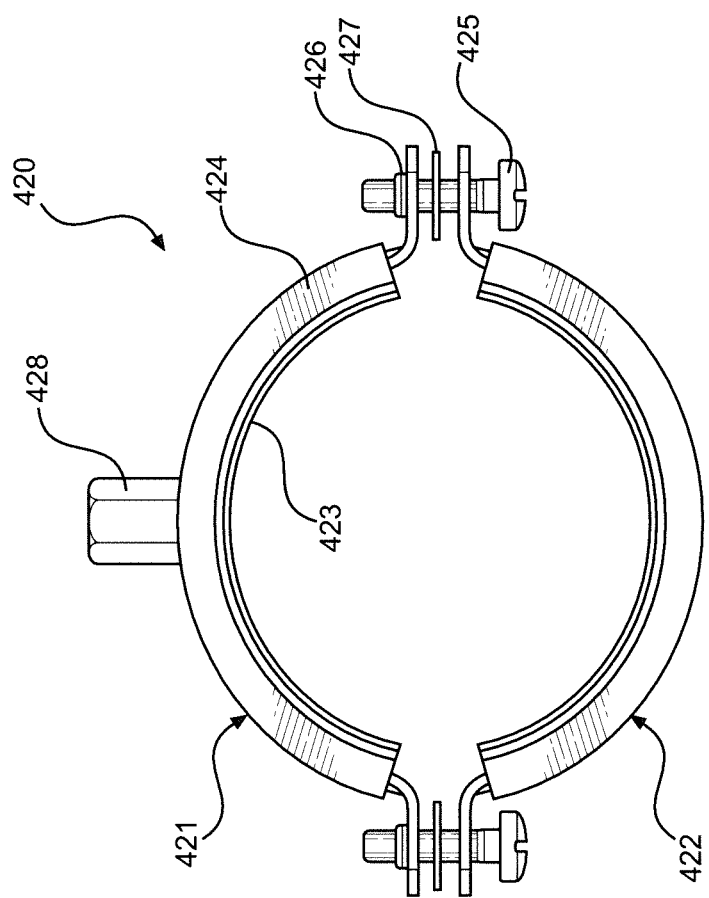
FIG. 10A is a drawing showing a two-piece clamp and hanger device, representing one element of the eighth embodiment of this invention.
Figure 10B:
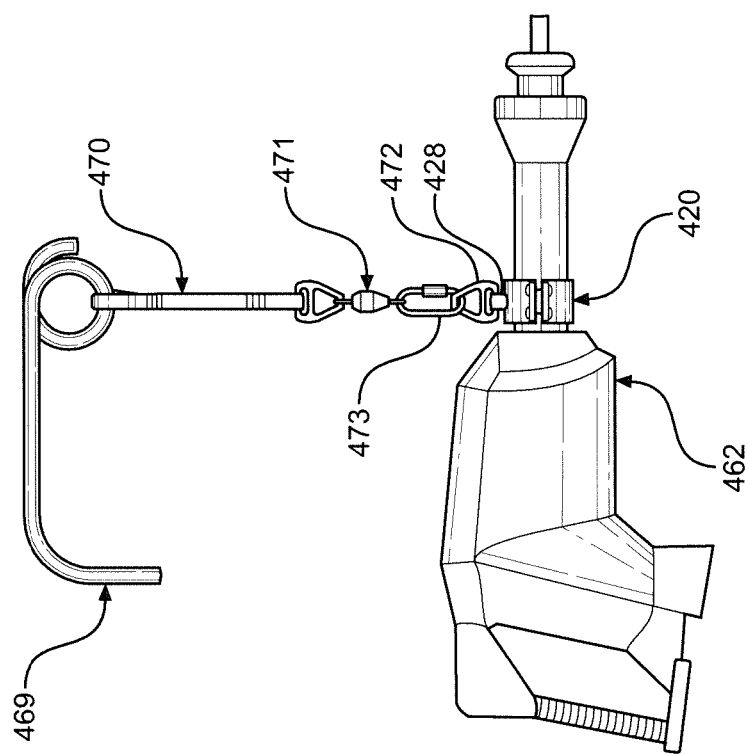
FIG. 10B is a drawing showing how a vertical hitch can be used to suspend a tool or object from a double-loop sling, with the tool or object being affixed to a clamp that envelops the tool, with this clamp having a device by which the sling can selectively couple to the adjustable strap, and with this sling being supported by a gravity-balancing arm and tool support post, representing the eighth embodiment of this invention.

The device of the eighth embodiment of this invention is shown in FIGS. 10A and 10B. This embodiment is similar to the fifth embodiment, but the adjustable strap that wraps around the tool is replaced with a clamp. FIG. 10A shows a two-piece clamp 420 having an upper clamp 421, a lower clamp 422, a rigid material 424 and a non-slip compressible material 423, with upper clamp 421 and lower clamp 422 being secured by a screw 425 and a bolt 426. In some cases, a spacer 427 is present to better fit clamp 420 to an object. Clamp 420 also has a clamp coupler 428 (shown as a nut in this figure).

FIG. 10B shows clamp 420 affixed to a tool 462, with clamp coupler 428 being connected to a clamp coupler connector 472 (shown as an eye bolt in this figure), with clamp coupler connector 472 being selectively coupled to a connector 473 (shown in this figure as a quicklink), with connector 473 being attached to strap 470 by strap coupling hardware 471, and with strap 470 being attached to a tool support post 469. Through this connectivity, the weight of tool 462 can be supported. In some embodiments, a single piece clamp, or another type of pipe, hose or barrel clamp known in the art, is used. In some embodiments, the clamp coupler is a ring, push disconnect attachment point or other coupling interface known in the art.

As an example of the eighth embodiment, consider a tool subject to high vibration that is in long-term use on a sling supported by a tool support post and gravity-balancing arm. Through use of the device of the eighth embodiment, this tool can be very securely mounted and used over the long term, with little chance of loosening and no risk of sling wear at the tool-sling interface (as no sling is in direct contact with the tool).

Figure 11A:
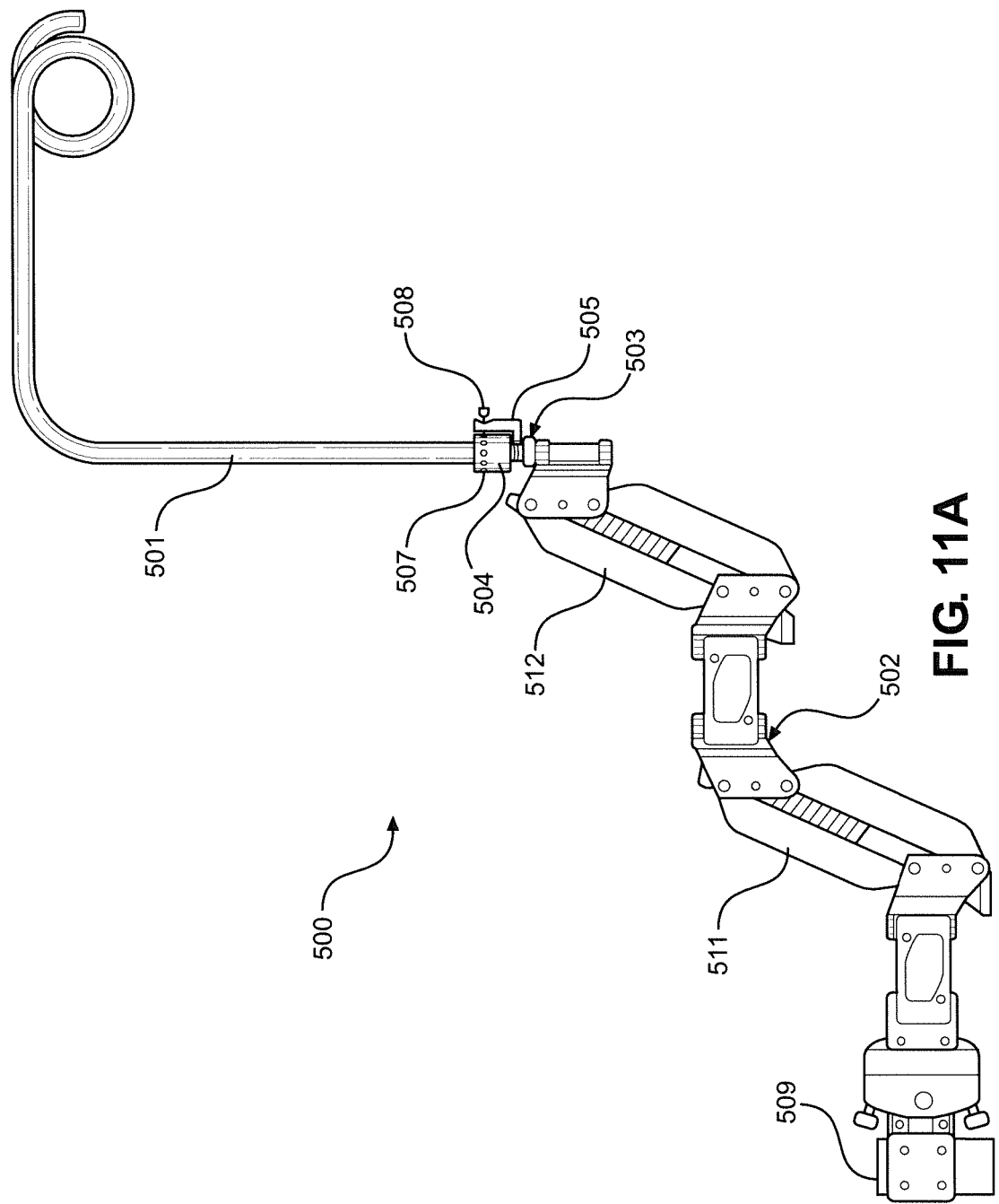
FIG. 11A is a drawing showing a gravity-balancing min and tool support post equipped with the device of the ninth embodiment of this invention.
Figure 11C:
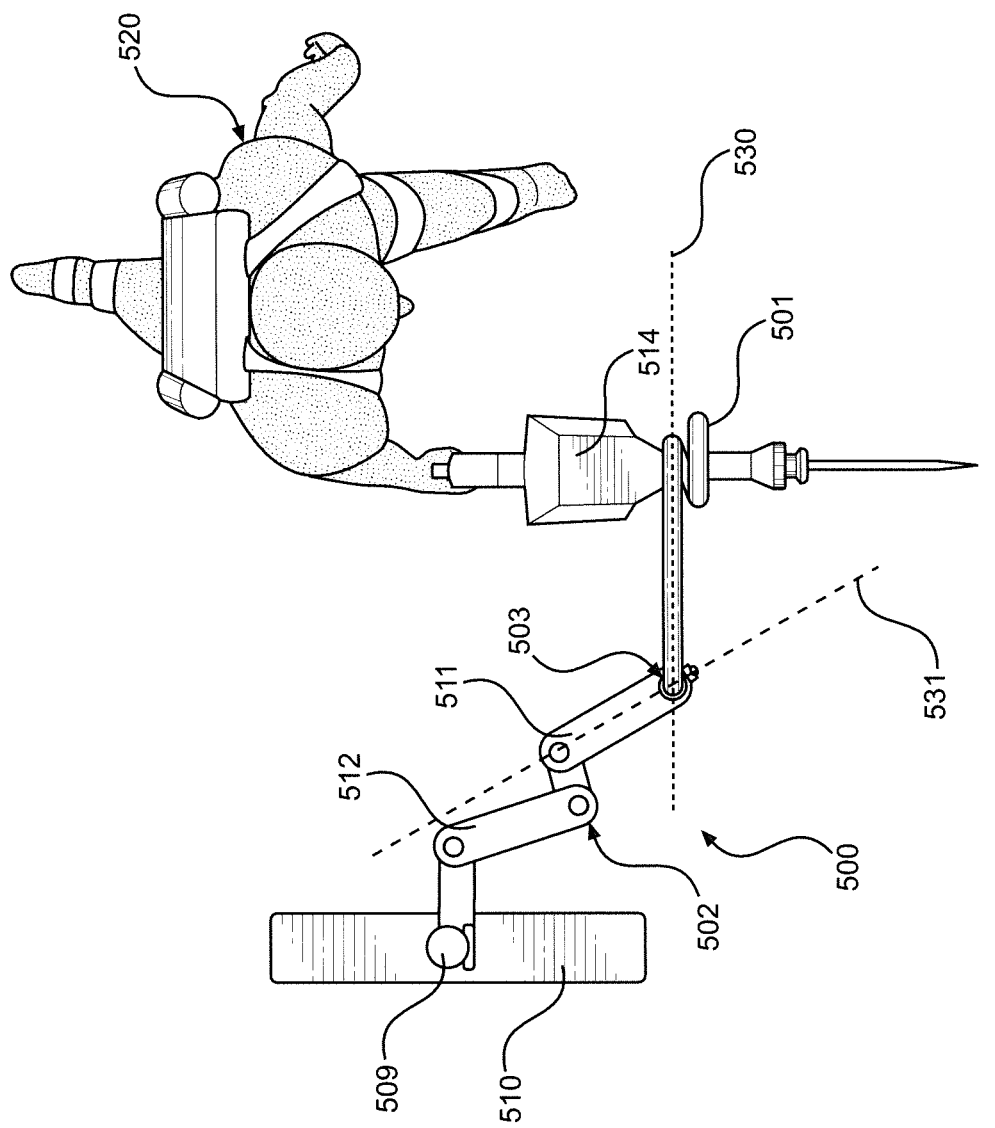
FIG. 11C is a drawing showing a person using a tool suspended by a sling from a gravity-balancing arm and tool support post, with the angle terminal link of the gravity-balancing arm being fixed relative to that of the tool support post in the axial plane, representing the device of the ninth embodiment of this invention, with this drawing showing the fixed relative angles of the tool support post and terminal link of the gravity-balancing arm.

The device of the ninth embodiment of this invention is shown in FIGS. 11A-C. This device serves to prevent uncontrolled rotation of the tool support post relative to the terminal linkage of the gravity-balancing arm. FIG. 11A shows a sling support system 500, with a gravity-balancing arm 502 being rotatably connected to a tool support post 501 at a lockable linkage (or selective locking device) 503. Tool support post 501 is attached to a pin lock guide 504, with pin lock guide 504 having radial holes 507 spaced at intervals around pin lock guide 504, and with pin lock guide 504 co-rotating with tool support post 501. A pin lock body 505 is attached to and fixed in place with a terminal segment 512 of gravity-balancing arm 502, with a spring-loaded pin 508 passing through pin lock body 505 and into pin lock guide 504 through one of the radial holes 507. When spring-loaded pin 508 is pulled away from pin lock guide 504, tool support 501 is allowed to rotate freely relative to terminal segment 512 of gravity-balancing arm 502. When spring-loaded pin 508 is released, it slides into the nearest radial hole 507 locking the relative positions of tool support 501 and terminal segment 512. The movement of a proximal segment 511, a mounting pivot 509 or other hinge joints of gravity-balancing arm 502 are unaffected by the state of lockable linkage 503.

FIGS. 11B and 11C show a person 520 using a tool 514 that is being supported by a sling (obscured from view at the angle of these figures), tool support post 501, gravity-balancing arm 502, mounting pivot 509 and a mounting surface 510. Lockable linkage 503 fixes the angle of tool support post 501 relative to terminal linkage 512 along relative planes 530 and 531, respectively.

As an example of the ninth embodiment, consider a manufacturing worker who is using a gravity-balancing arm with a tool support post and sling to support the weight of a tool while moving around a work surface. Through use of the device of the ninth embodiment, the worker can keep the tool post and gravity-balancing arm out of his or her way as he or she changes tool angles and moves about the work surface, preventing clash of the gravity-balancing arm with the person, tool or work surface and improving worker comfort.

Figure 12:
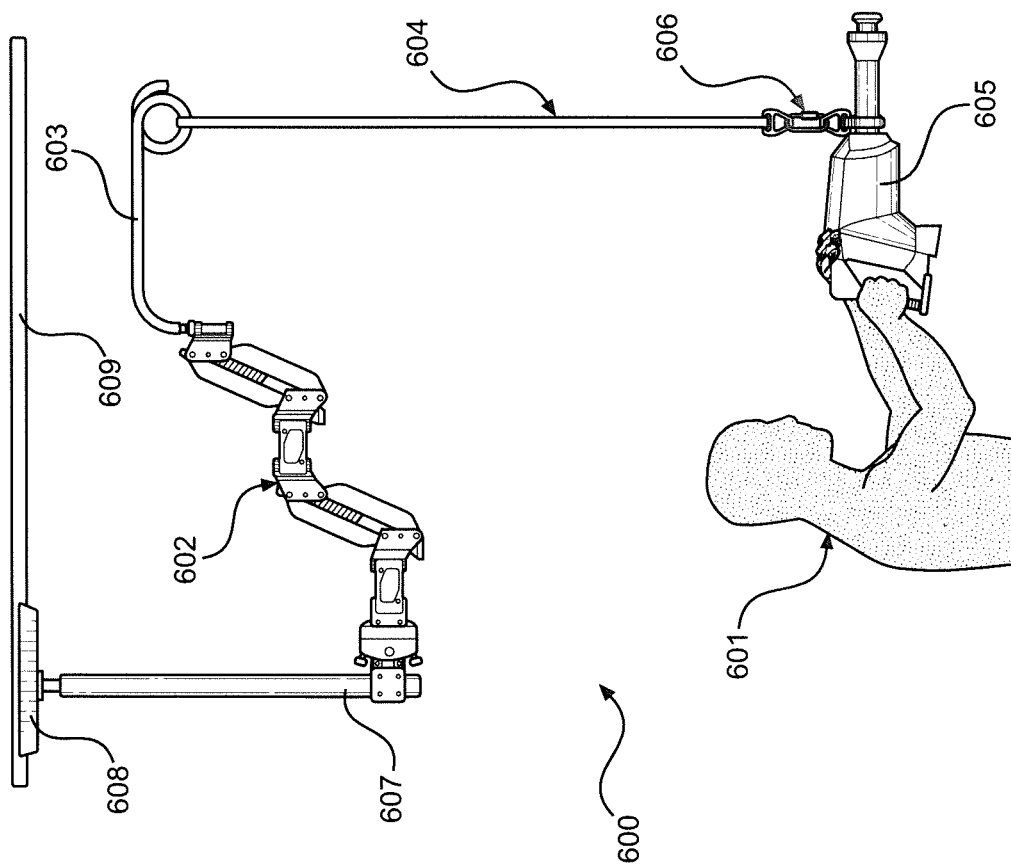
FIG. 12 is a drawing showing a person using a tool that is suspended from a long tensile member affixed to a gravity-balancing arm and tool support post, with the gravity-balancing arm and tool support post being mounted on a movable track, with the movable track being affixed to a surface above the person, representing the device of the tenth embodiment of this invention.

The device of the tenth embodiment of this invention is shown in FIG. 12. This device allows the mounting base of a tool support system to be moved, expanding the area of potential tool use. In FIG. 12, a tool support system 600 is attached to a movable linkage 608, with movable linkage 608 traveling along an overhead track 609, and with tool support system 600 having a vertical post 607, a gravity-balancing arm 602, a tool support extension 603, a support sling 604 and a tool-sling linkage 606. A person 601 is using a tool 605, with the weight of tool 605 being supported by tool support system 600. As person 601 moves through the workspace, the position of movable linkage 608 can be changed along overhead track 609. In some embodiments, the movement of the movable linkage along the track is powered. In some embodiments, the movement of the movable linkage along the track is unpowered. In some embodiments, the position of the movable linkage is lockable along the overhead track. In one very simple embodiment, the overhead track functions like a garage door opener track along a ceiling, with only two positions (bring the tool and support into the workspace and remove the tool and support from the workspace).

As an example of the tenth embodiment, consider a worker in a manufacturing environment that is using a gravity-balanced tool in a large workspace. Through use of the device of the tenth embodiment, the working range of the gravity-balanced tool is greatly increased. In powered embodiments, the worker can summon a tool to the proper position along a track, only needing to reach up and grab the tool when it arrives, and then send the tool away when the work activity is complete.

The device of the eleventh embodiment of this invention is shown in FIG. 13. This embodiment allows a tool supported by a gravity-balancing arm and tensile member support system to receive power through the mounting track. In FIG. 13, a tool support system 610 is attached to a movable linkage (or surface mount) 638, with movable linkage 638 traveling along an overhead track 619, and with tool support system 610 having a vertical post 637, a gravity-balancing arm 632, a tool support extension 633, a support sling 634 and a tool-sling linkage 636. A person 620 is using a tool 635, with the weight of tool 635 being supported by tool support system 610. Tool 635 receives power from a power cord (or power supply conduit) 611 and ultimately from an outlet 612 on movable linkage 638, with movable linkage 638 receiving power from overhead track 619. Power cable 611 is routed along sling 634, tool support extension 633, gravity-balancing arm 632 and vertical post 637, with cord retainers 624 attaching power cord 611 in place. In some embodiments, the track is an electrified track, as seen in track lights, or makes use of a paddle system, as seen in some streetcars, or makes use of other power transfer mechanisms known in the art.

As an example of the eleventh embodiment, consider a worker in a manufacturing environment that is using a powered gravity-balanced tool in a large workspace. Through use of the device of the eleventh embodiment, the working range of the powered gravity-balanced tool is greatly increased without the hazards associated with long power cords or the inconvenience of having to reconnect power in various locations.

Figure 14B:
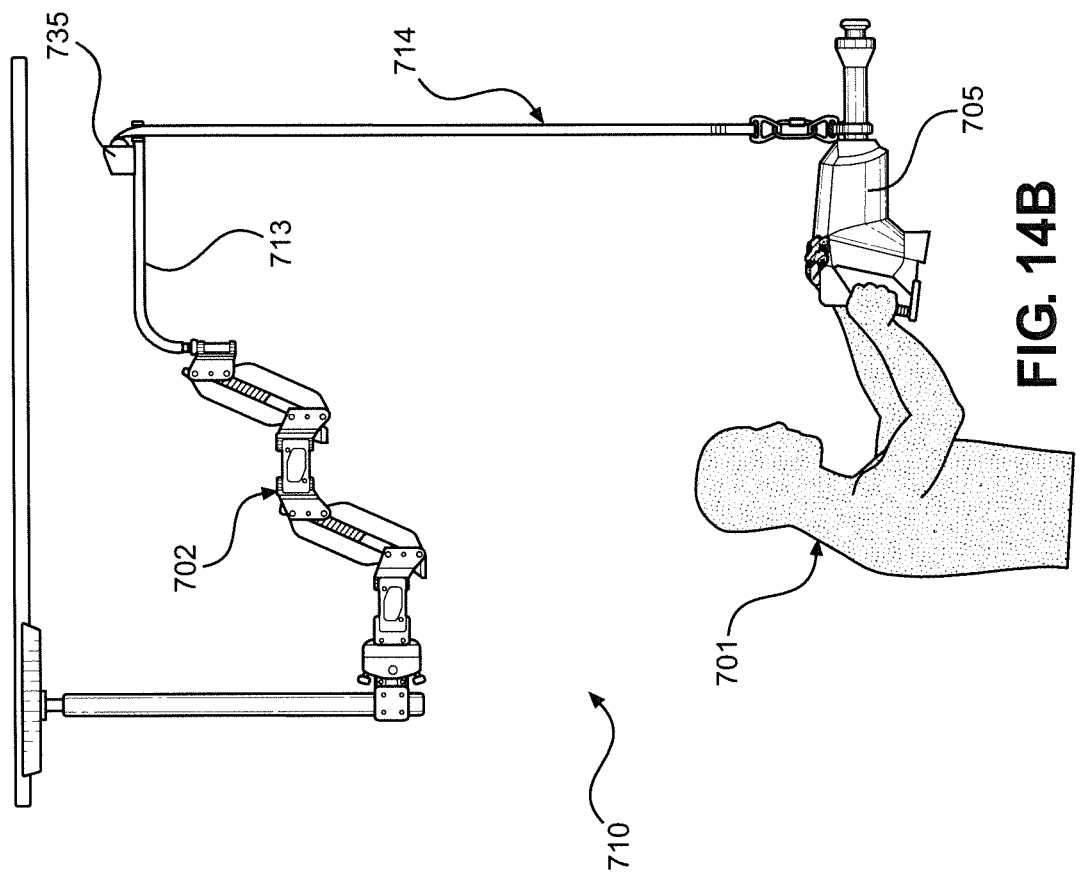
FIG. 14B is a drawing showing a person using a tool that is suspended from a long sling affixed to a gravity-balancing arm and tool support post, with the gravity-balancing arm and tool support post being mounted on a surface or movable track above the person, and with a winch mounted on the tool support post connecting to the upper end of the sling allowing the sling length to be adjusted, representing a variant device of the twelfth embodiment of this invention.

The device of the twelfth embodiment of this invention, which allows the length of the tool support sling to be changed while the tool is still being supported, is shown in FIGS. 14A and 14B. FIG. 14A shows a person 701 using a tool 705, with tool 705 being supported by a tool support system 700, and with tool support system 700 having a sling 704, a tool support extension 703 and a gravity-balancing arm 702. A ratchet 725 in the lower portion of sling 704 allows person 701 to change the length of sling 704 without removing tool 705 from support. FIG. 14B shows a tool support system 710 having a sling 714, a tool support extension 713 and a gravity-balancing arm 702, with a winch 735 affixed to the top of sling 714. Winch 735 controls the length of sling 714. In some embodiments, the winch or ratchet are interchanged in position. In some embodiments, the winch is powered and/or controllable remotely (such as by the person using the tool). In some embodiments, the winch also controls the length of a power cord (e.g., power cord 611).

As an example of the twelfth embodiment, consider a person cleaning a tank wall in a refinery, with a tool being supported by a gravity-balancing tool support system mounted above them at the rim of the tank. The device of the twelfth embodiment would allow the tool to be lowered to them, used and then raised after the completion of the work task.

Figure 15A:
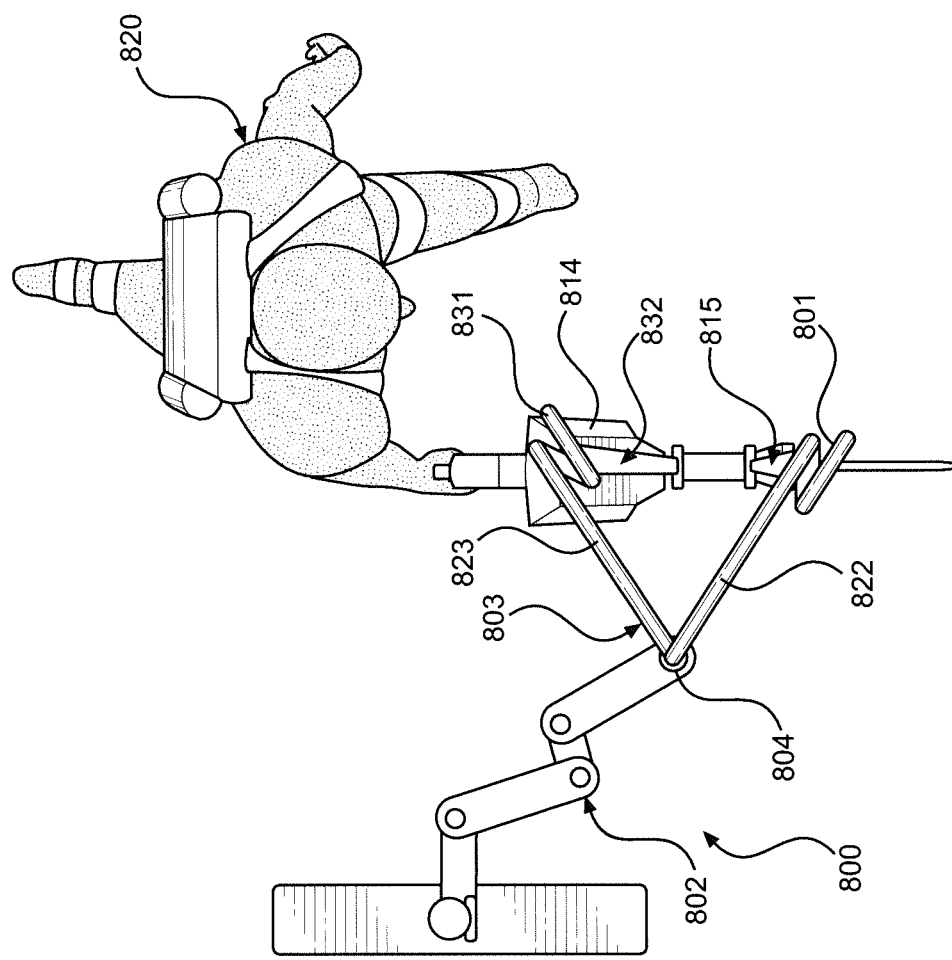
FIG. 15A is a drawing showing a person using a tool that is suspended by two slings, each attached to separate sling support arm points, with these sling support arms being affixed to a gravity-balancing arm and tool support post, representing the device of the thirteenth embodiment of this invention.
Figure 15B:
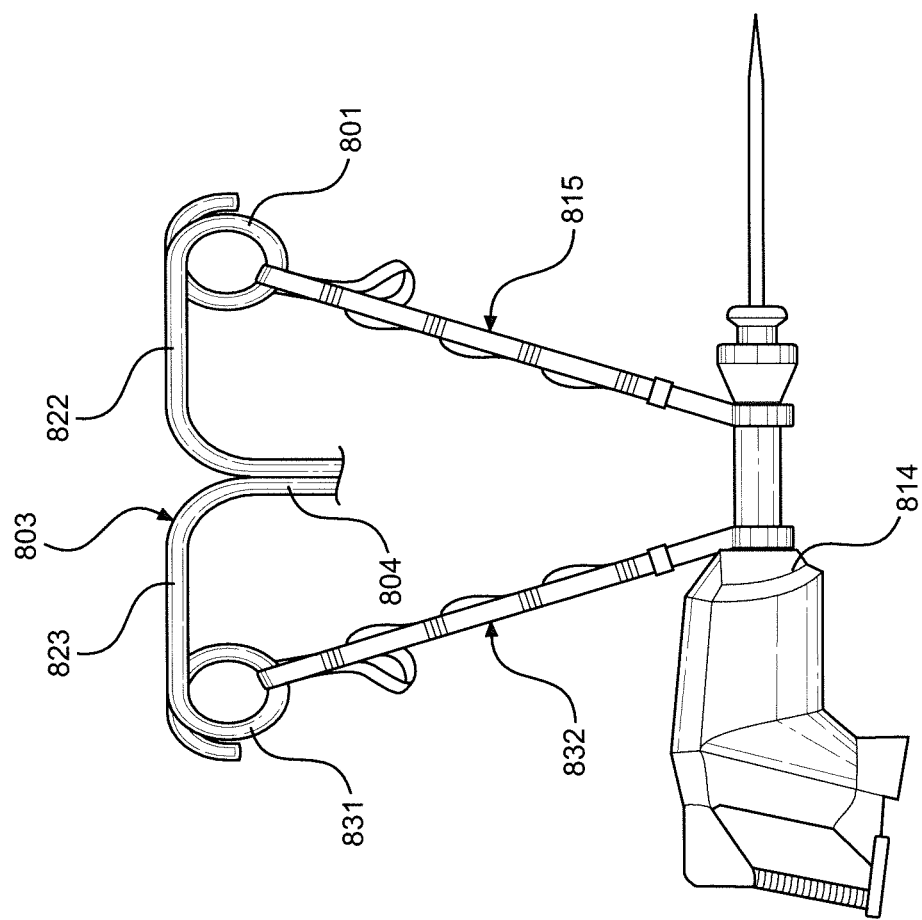
FIG. 15B is a drawing showing a tool that is suspended by two slings, each attached to separate sling support arm points, representing one element of the device of the thirteenth embodiment of this invention.
Figure 15C:
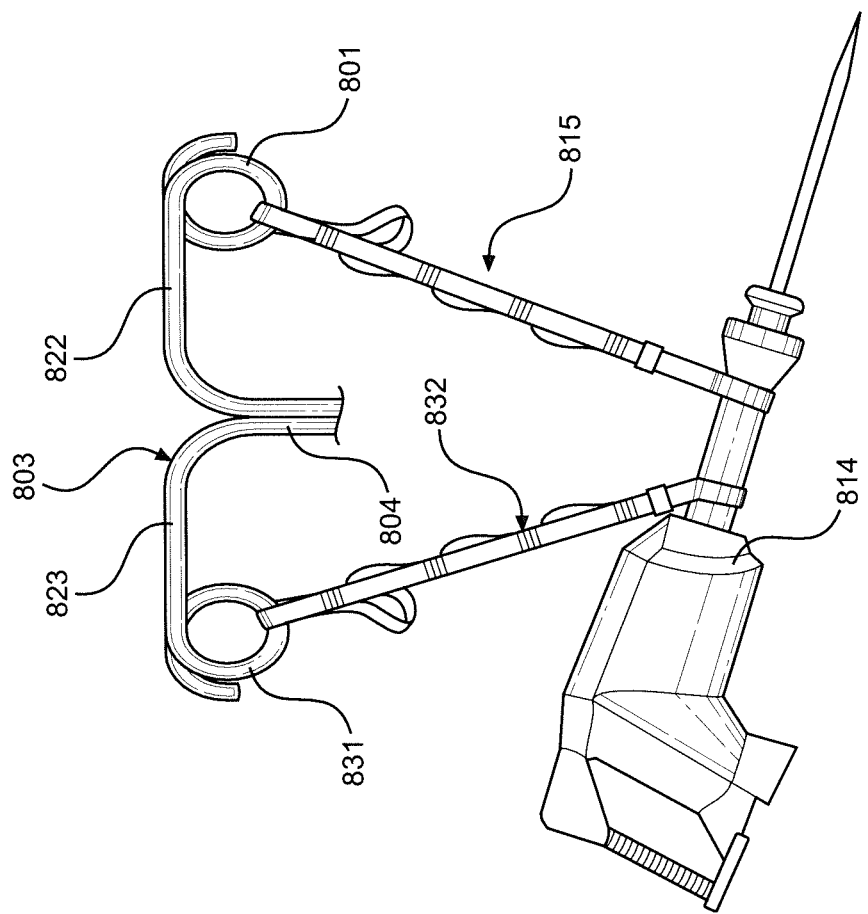
FIG. 15C is a drawing showing a tool that is suspended by two slings, each attached to separate sling support arm points, representing one element of the device of the thirteenth embodiment of this invention, with the lengths of the support slings being uneven in this figure, resulting in a different tool angle relative to that shown in FIG. 15B.

The device of the thirteenth embodiment of this invention is shown in FIGS. 15A-C. This embodiment adds a second tool support sling and tool support sling attachment point onto the gravity-balancing arm, resulting in two slings being attached to the tool, and potentially improving the stability of the tool or fixing the angle of the tool relative to the work surface. FIGS. 15A and 15B show a gravity-balancing tool support system 800 having a gravity-balancing arm 802 and a split tool support arm 803, with split tool support arm 803 having a vertical riser 804, a forward arm (or rigid support extension) 822 and a rearward arm (or rigid support extension) 823, and with forward arm 822 and rearward arm 823 having a forward pigtail loop 801 and a rearward pigtail loop 831, respectively. A forward tool support sling 815 and a rearward tool support sling 832 (both of which are shown as daisy chain slings in these figures) are mounted on forward pigtail loop 801 and rearward pigtail loop 831, respectively, with both forward tool support sling 815 and rearward tool support sling 832 being connected to a tool 814 (using choker hitch knots in these figures). This connectivity allows the weight of tool 814 to be supported by gravity-balancing arm 802, resulting in an easier tool use for person 820. The dual connectivity of the two slings to the tool results in increased tool stability/decreased rotational freedom in the vertical plane (the sagittal plane, as shown in FIG. 15A), which may be desirable in some applications, such as riveting, welding or drilling. FIG. 15C shows how the stabilized angle of the tool can be altered by shortening or lengthening the support sling, although a winch or ratchet system would allow finer control of the angle than shown in this example. In some embodiments, the slings attach at the same location on the tool, resulting in greater rotational freedom of the tool but allowing for more tool weight to be supported and better sling grip on the tool as compared to a single sling.

As an example of the thirteenth embodiment, consider a worker at a quarry who is using a gravity-balancing tool support system to support a heavy drill being used for drilling multiple holes at a fairly set angle for blasting. Through use of the device of the thirteenth embodiment, the support system provides greater stability to the tool and makes it easier for the worker to control the angle of the drilling.

Based on the above, it should be readily apparent that the present invention provides a device that connects a gravity-balancing arm to a tool in such a way that the tool, person and work surface are at a greater distance from the gravity-balancing arm to allow better maneuverability in certain work tasks and to reduce the exposure of the mechanical systems of the gravity-balancing arm to workspace-related environmental hazards. The present invention also provides a device that allows the gravity-balancing arm to be mounted well above the location of the tool. While certain preferred embodiments of the present invention have been set forth, it should be understood that various changes or modifications could be made without departing from the spirit of the present invention. For instance, in some embodiments, high friction material is used to improve the grip of the sling to the tool, including but not limited to wrapping a secondary brand of grip (such as a sheet of rubber or ethylene propylene diene monomer (EPDM) rubber) around the tool between the tool and the sling or using strapping coated with silicone or otherwise impregnated with material to increase grip. In addition, in some embodiments, the various embodiments of this invention are combined. In general, the invention is only intended to be limited by the scope of the following claims.

The invention claimed is:

1. A positionable tool support device, configured to be mounted near a work surface for supporting a tool for a user, comprising:
    a surface mount configured to secure the tool support device to a support surface;
    a gravity-balancing articulated arm assembly coupled to and extending from the surface mount, said gravity-balancing articulated arm assembly being selectively adjustable about both vertical and horizontal axes relative to the surface mount;
    a rigid support extension coupled to the gravity-balancing articulated arm assembly;
    a flexible tensile member coupled to and extending, in a relaxed state, vertically downward from the rigid support extension, wherein the tensile member is configured to be coupled to the tool; and
    in combination, a tool directly supported by the tensile member, said tool including a handle portion configured to be grasped by the user, an opposing end portion carrying a work implement, and an intermediate body portion extending between the handle portion and the opposing end portion, said tensile member being coupled to the tool at the intermediate body portion.

2. The positionable tool support device of claim 1, wherein the support extension is selectively rotatable relative to the gravity-balancing articulated arm assembly.

3. The positionable tool support device of claim 1, wherein said rigid support extension extends above the user of the tool support device.

4. The positionable tool support device of claim 1, wherein the gravity-balancing articulated arm assembly extends upward from the surface mount.

5. The positionable tool support device of claim 1, wherein the tensile member is comprised of a loop of flexible sling, and the tensile member is configured to be coupled to the tool using a girth hitch knot formed by the loop.

6. The positionable tool support device of claim 1, wherein the tensile member is comprised of a double-loop sling, and the tensile member is configured to be coupled to the tool using a choker hitch knot formed by the double-loop sling.

7. The positionable tool support device of claim 1, wherein the tensile member is comprised of a daisy chain loop sling, and the tensile member is configured to be coupled to the tool using a choker hitch knot formed by the daisy chain loop sling.

8. The positionable tool support device of claim 1, wherein the tensile member is comprised of a double-loop sling, the tool support device further comprising an adjustable loop sling and a ring, wherein the double-loop sling is coupled to the adjustable loop sling by the ring.

9. The positionable tool support device of claim 8, further comprising a selective coupler, wherein the double-loop sling is coupled to the adjustable loop sling by the selective coupler.

10. The positionable tool support device of claim 9, further comprising a swivel, wherein the double-loop sling is coupled to the selective coupler by the swivel.

11. The positionable tool support device of claim 8, further comprising a swivel, wherein the double-loop sling is coupled to the adjustable loop sling by the swivel.

12. The positionable tool support device of claim 8, further comprising an adjustable sling coupled to the ring and configured to be coupled to the tool.

13. The positionable tool support device of claim 8, further comprising an adjustable sling coupled to the adjustable loop sling and configured to be coupled to the tool.

14. The positionable tool support device of claim 1, wherein the tensile member is comprised of a double-loop sling, the tool support device further comprising a clamp and a selective coupler, wherein the double-loop sling is coupled to the clamp by the selective coupler.

15. The positionable tool support device of claim 14, further comprising a swivel, wherein the double-loop sling is coupled to the clamp by the swivel.

16. The positionable tool support device of claim 1, further comprising a selective locking device that selectively fixes a relative position of the gravity-balancing articulated arm assembly and the rigid support extension in an axial plane.

17. The positionable tool support device of claim 1, further comprising an overhead track along which a position of the surface mount can be changed.

18. The positionable tool support device of claim 17, wherein the surface mount is configured to receive power from the overhead track, the tool support device further comprising a power supply conduit configured to transfer power from the surface mount to the tool.

19. The positionable tool support device of claim 18, further comprising a winch coupled to the rigid support extension, wherein the winch is configured to shorten or lengthen the tensile member and the power supply conduit.

20. The positionable tool support device of claim 1, further comprising a winch coupled to the rigid support extension, wherein the winch is configured to shorten or lengthen the tensile member.

21. The positionable tool support device of claim 1, further comprising a power supply conduit configured to transfer power from the surface mount to the tool.

22. The positionable tool support device of claim 1, further comprising a ratchet coupled to the tensile member, wherein the ratchet is configured to shorten or lengthen the tensile member.

23. The positionable tool support device of claim 1, further comprising:
  a second rigid support extension coupled to the gravity-balancing articulated arm assembly; and
  a second flexible tensile member coupled to and extending, in a relaxed state, vertically downward from the second rigid support extension, wherein the second tensile member is configured to be coupled to the tool.

* * * * *